(12) United States Patent
Chen

(10) Patent No.: US 12,530,164 B2
(45) Date of Patent: Jan. 20, 2026

(54) SYSTEMS AND METHODS FOR CONTROLLING CONTENT FROM WITHIN AN EXTENDED REALITY ENVIRONMENT

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 207 days.

(21) Appl. No.: 18/374,152

(22) Filed: Sep. 28, 2023

(65) Prior Publication Data
US 2025/0110682 A1    Apr. 3, 2025

(51) Int. Cl.
*G06F 3/14* (2006.01)
*G06F 3/04815* (2022.01)

(52) U.S. Cl.
CPC ........ *G06F 3/1454* (2013.01); *G06F 3/04815* (2013.01)

(58) Field of Classification Search
None
See application file for complete search history.

(56) References Cited

U.S. PATENT DOCUMENTS

| | | | | |
|---|---|---|---|---|
| 9,868,449 B1* | 1/2018 | Holz | ................. | B60W 50/10 |
| 11,778,159 B2* | 10/2023 | Holz | ................. | G06F 3/011 |
| | | | | 348/47 |
| 12,002,181 B2* | 6/2024 | Seva | ................. | G06T 19/006 |
| 12,020,692 B1* | 6/2024 | Ryali | ................. | G10L 15/08 |
| 2019/0371196 A1* | 12/2019 | Pittman | ................. | G09B 9/05 |
| 2023/0158405 A1* | 5/2023 | Holm | ................. | G06F 3/04815 |
| 2024/0185546 A1* | 6/2024 | Etwaru | ................. | G06V 20/64 |
| 2024/0264664 A1* | 8/2024 | Sandridge | ................. | A63F 13/67 |
| 2024/0289765 A1* | 8/2024 | Nair | ................. | G06F 3/0482 |
| 2024/0404420 A1* | 12/2024 | Bradford | ................. | G09B 7/02 |

OTHER PUBLICATIONS

Charudatta "Best AirDrop for Android Solutions 2023," https://www.airdroid.com/file-transfer/airdrop-for-android/#:%7E:text=Android%20AirDrop%20as%20the%20name,transfer%20speed%20is%20super%2Dquick (2023) Retrieved from Internet Dec. 11, 2023.
Fedewa "AirDrop for Android: How to Use Android Nearby Share," https://www.howtogeek.com/684434/airdrop-for-android-how-to-use-android-nearby-share/ Retrieved from Internet Dec. 11, 2023.
https://forwork.meta.com/horizon-workrooms/ Retrieved from Internet Dec. 11, 2023.

* cited by examiner

*Primary Examiner* — Toan H Vu
(74) *Attorney, Agent, or Firm* — HALEY GUILIANO LLP

(57) ABSTRACT

Systems and methods are provided for controlling content from within a virtual environment. First and second extended reality devices and at least one user device are connected to the virtual environment, each extended reality device providing a user with interactive access to the virtual environment. Display data, based on a display of the user device, is received from the user device. An interactive virtual representation of the display is generated based on the display data. Input is received from one of the users via the virtual environment. Operational instructions, based on the received input, are communicated to the user device, with the operational instructions configured to instruct the user device to perform functions based on the received input.

20 Claims, 8 Drawing Sheets

SYSTEMS AND METHODS FOR CONTROLLING CONTENT FROM WITHIN AN EXTENDED REALITY ENVIRONMENT

BACKGROUND

The present disclosure is generally directed to systems and methods for controlling content from within an extended reality (XR) environment by leveraging the capabilities of one or more user devices bridged via the XR environment. In particular, systems and methods are provided herein which leverage the programming and processing capabilities of one or more user devices to modify content and/or leverage the communication capabilities of one or more user devices to share content directly between user devices from within the XR environment.

SUMMARY

Extended reality (XR) environments are emerging as a new paradigm for socializing and interacting in personal and professional settings. As XR environments continue developing (e.g., in metaverse applications), scenarios may arise where users want access to content that already exists on their devices (e.g., smart phones, tablet computers, laptop computers, desktop computers, etc.) while in an XR environment. In addition to access, users may also want to view, edit, save, and share, among other actions, that content within XR environments. However, the process of loading a file into the XR environment, editing it within the XR environment, and then afterward retrieving the edited file from the XR environment can be difficult and, for some, time consuming. In addition, the editing tools available within the XR environment may not be familiar to the users, and so there may be a substantial learning curve for the users to be able to achieve their desired results when editing content.

As an illustrative example, at present, in order to collaborate in an XR environment on a project, such as editing an image located on one of the user's smart phones, the user with the image would need to make the image available to the XR environment in advance of the collaboration. Or, if the image was not made available in advance, the user would have to drop out of the XR environment, transfer the image to make it available in the XR environment, and then jump back into the XR environment to participate in the collaboration. Once the users finish their collaboration, then each would have to exit the XR environment and download the edited image to one of their own devices (e.g., their smartphone, tablet computer, laptop computer, etc.).

A need, therefore, exists to simplify this type of cumbersome collaboration process. To overcome such shortcomings, systems and methods that aid in integrating user devices into the XR environment may be employed as part of the collaboration process. In addition, such integration can help improve other aspects of using an XR environment, beyond just content collaborations, by enabling greater interaction between the XR environment and the user devices outside of the XR environment.

To this end, systems and methods are presented for bridging XR devices with user devices such as smart phones, tablet computers, laptop computers, and the like via the XR environment such that a user may interact with the user devices to control content from within the XR environment. In the XR environment, the XR engine generates an interactive virtual representation (also referred to as a "virtual twin") of a user device based a display of the user device. In some embodiments, the interactive virtual representation may be based on the primary display of the user device, such as the screen of a smart phone or tablet computer, or an LED display connected to a laptop computer or desktop computer. In some embodiments, the interactive virtual representation may be based on a secondary display of the device, even if that secondary display is not being actively displayed by the device outside of the XR environment. Within the XR environment, the user may interact with the interactive virtual representation of the user device just as the user would interact with the user device itself outside of the XR environment. The XR engine may translate the user's interaction with the XR environment or with the interactive virtual representation into operational instructions that are communicated to the user device. Such operational instructions instruct the user device to execute functions based upon the user's interactions with the interactive virtual representation or with the XR environment itself. Thus, through the virtual bridge that the XR environment establishes with the user device, the user can control the user device, and therefore also control content on the user device, without leaving the XR environment. The user in the virtual environment may therefore operate the user device to make calls, send text messages, edit content, share content, retrieve content and other resources from network locations, and much more, limited only by the capabilities of the user device itself.

In some embodiments, two (or more) users may join into the XR environment, each using an XR device, and each user may bridge an associated user device into the XR environment. In such embodiments, the XR engine generates an interactive virtual representation in the XR environment for each connected user device, and the XR environment may be configured such that each participating user may be enabled to virtually interact with any of the interactive virtual representations. In doing so, users may collaborate within the XR environment to edit content on any one of the user devices. Once the collaborative process is completed, the users may use the interactive virtual representations of the user devices to share the content amongst themselves or send the content elsewhere for review. Thus, at the end of the collaborative process, copies of the edited content end up right where the users want them to be (e.g., saved to an online storage service, saved in a photos app on individual smart phones, sent off to a client via email from one of the users, and the like) prior to leaving the XR environment.

By creating interactive virtual twins of user devices within the XR environment, several advantages may be realized beyond the obvious of enabling use of the user devices within the XR environment and facilitating collaborations. In one advantage, the user devices can relieve the XR engine of processing load, because the user devices themselves may be used for the processing load when editing or displaying content. When the collaboration involves viewing media content (such as two users watching a movie together in the XR environment), each individual user device may bear the processing load of displaying the content to the respective user's XR device. In another advantage, at any point a user may interact with a user device to draw additional content into the XR environment without ever having to leave the XR environment. This additional content may be sourced from any network location that is accessible to the user device itself, and advantageously, the additional content is not only brought into the XR environment, but it may also be stored on the user device simultaneously for access outside the XR environment. In yet another advantage, applications that are available on the user's device may become available within the XR environment, and since user devices already have a broad spectrum of applications available for accessing, editing, and sharing content, all those applications and their associated features may be accessible to users within the XR environment. With these advantages and other aspects of the described systems and methods herein, the XR environment of the present disclosure addresses the aforementioned shortcomings of existing XR environments.

BRIEF DESCRIPTION OF THE DRAWINGS

The above and other objects and advantages of the disclosure may be apparent upon consideration of the following detailed description, taken in conjunction with the accompanying drawings, in which.

DETAILED DESCRIPTION

Figure 1:
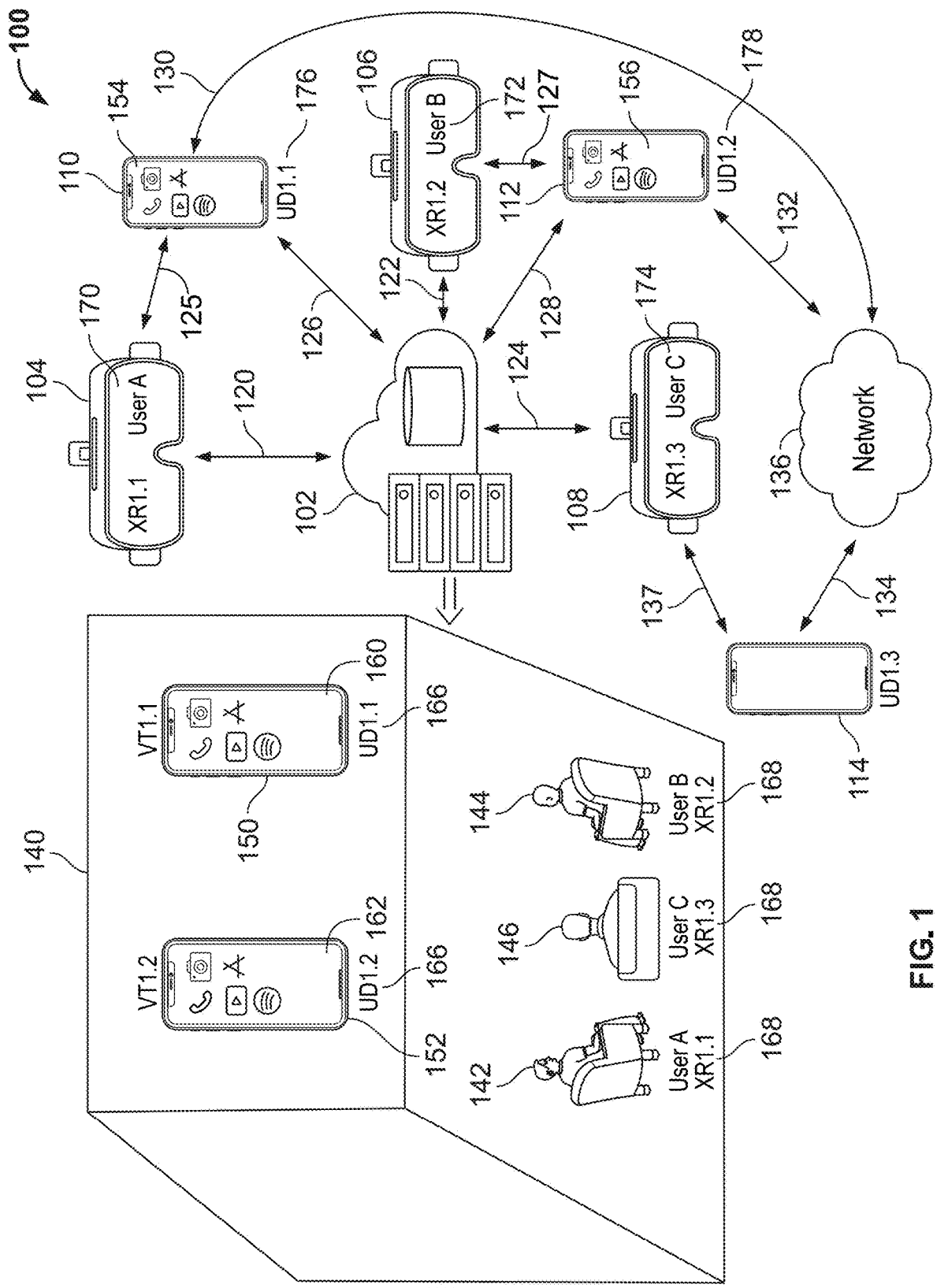
FIG. 1 shows an exemplary environment in which an XR framework bridges extended reality devices and user devices via a virtual environment, in accordance with some embodiments of this disclosure.

Systems and methods are described herein for an XR framework bridging XR devices and user devices via an XR environment and generating interactive virtual twins of the user devices, thereby enabling users to interact with bridged user devices from within the XR environment.

As referred to herein, the term "content" should be understood to mean an electronically consumable asset that may be accessed using any suitable electronic platform, such as broadcast television, pay-per-view, on-demand media (as in video-on-demand (VOD) systems), network-accessible media (e.g., streaming media, downloadable media, Webcasts, etc.), video clips, audio, haptic feedback, information about media, images, animations, documents, playlists, websites and webpages, articles, books, electronic books, blogs, chat sessions, social media, software applications, games, virtual reality media, augmented reality media, and/or any other media or multimedia and/or any combination thereof.

Extended reality (XR) content, which is a particular type of content, refers to augmented reality (AR) content, virtual reality (VR) content, hybrid or mixed reality (MR) content, and/or other digital content combined therewith to mirror physical-world objects or to be otherwise viewed or interacted with in a virtual environment.

As described herein, the term "virtual environment" and its variants refer to an artificial, interactive, digitally generated scene or world and include immersive media and/or 4D content. As described herein, the term "virtual space" and its variants refer to a space having defined bounds in a virtual environment and within which models, avatars, and/or other virtual representations of physical objects (e.g., a digital twin, virtual twin, etc.) may engage, communicate, and interact, among other activities. As described herein, the term "virtual proximity" and its variants refer to digital models and/or other such representations being perceived as close to one another in the virtual environment, including, but not limited to, a proximity threshold, virtual contact, collision detection, the models' position in a virtual space, the models' coordinates in a virtual space, and/or an information exchange that establishes protocols for a communication link. As described herein, the terms "virtual bridge" or "bridge" refer to a communication path that has at least one virtual component (e.g., a connection facilitated within the virtual environment) and may include one or more non-virtual components and/or networks, the virtual bridge communicably coupling two or more devices. A communication path including a virtual bridge may be referred to as a virtual connection and/or a virtual network. As described herein, the terms "communication link" or "link" and variants thereof refer to a communication path, including both wired and RF-based connections, that communicably couples two or more devices and includes one or more non-virtual components and/or networks without the use of any virtual components (e.g., a virtual bridge).

As described herein, an XR framework may include hardware, software, firmware, and/or any combinations of components thereof, where any of the involved systems may perform one or more of actions of the described techniques without departing from the teachings of the present disclosure. It is noted and appreciated that reference to an XR framework is provided for conciseness and may refer to one or more parts of the XR framework, and combinations thereof, that performs the described actions. Some non-limiting examples are described as follows. For example, an XR framework may include a locally hosted application at a user device. For example, an XR framework may include a virtual network between various devices. For example, an XR framework may include a remote application such as an XR environment system hosted at a server communicatively coupled to one or more user devices and other systems linked to a user device, where the XR environment system provides instructions that are transmitted to the user devices and executed by the relevant systems at the respective locations of the user devices. For example, an XR framework may include a subsystem integrated with user equipment. For example, an XR framework may include a local application hosted at user equipment and a remote system communicatively coupled therewith.

Although described in the context of XR content and devices herein, the systems and techniques described herein are intended to be non-limiting and may be applicable within other contexts. For example, a virtual environment may include other digitally generated settings (e.g., a world in a gaming application). For example, an XR framework may include servers and applications for rendering various virtual environments. For example, virtual representations may include user avatars that are generated and/or projected for a physical location (e.g., for viewing a physical sporting event). For example, participants using a videoconferencing or teleconferencing application may be virtually proximate by attending the same videoconference or accessing the same breakout session within the videoconference. The participants may establish a virtual connection via their devices (e.g., a personal computer, a conferencing system hub, etc.). A virtual connection may be applicable for various situations, including MR scenarios. The examples described herein are illustrative, and the described techniques may be extended to include the various situations.

FIG. 1 shows an example scenario 100 of an XR framework 102 bridging virtually proximate XR devices 104, 106, 108 (labeled as XR1.1, XR1.2, and XR1.3, respectively) and user devices 110, 112 (labeled as UD1.1 and UD1.2, respectively) to enable users to control content from within a virtual environment. As discussed further below, each XR device 104, 106, 108 includes a display screen for presenting the virtual environment 140 to the user of each respective XR device. Any one or more of the XR devices 104, 106, 108 may be an XR head-mounted device (HMD) or other wearable device for interacting with an XR environment. User devices 110, 112 are associated with and communicably linked to XR devices 104, 106 through communication paths 125, 127, respectively. These same communication paths 125, 127, may also be used for communications between the XR framework 102 and the user devices 110, 112. Similarly, as discussed further below, each user device 110, 112 includes a display screen. The user device 114 (labeled as UD1.3) is associated with and linked to XR device 108.

In this scenario 100, the XR framework 102 is communicably linked to the XR devices 104, 106, 108 via communication paths 120, 122, 124, respectively. The XR framework 102 may also be communicably linked to the user devices 110, 112 directly via respective communication paths 126, 128. In some embodiments, the communication paths 125, 127 between the XR framework 102 and the user devices 110, 112 may be omitted. It should be noted that, in this scenario 100, the XR framework 102 is not communicably linked to the user device 114 by communication path 137. Also in this scenario 100, each user device 110, 112, 114 is communicably linked to the network 136 via respective communication paths 130, 132, 134, and the network 136 enables links to be established by and between each of the user devices 110, 112, 114. Each of the communication paths identified herein (e.g., 125, 126, 127, 128, 130, 132, 134) may include a plurality of paths, networks, intervening nodes, edge servers, etc. Further, each of the communication paths are described herein as single paths for conciseness, and this description is intended to be non-limiting. In bridging the XR devices 104, 106, 108 and the user devices 110, 112, the XR framework 102 may establish communication paths between devices (e.g., a virtual connection), any of which may include portions of communication paths 120-128. The example configurations of the XR framework 102 and communication paths 120-128 described herein are intended to be illustrative and non-limiting. The XR framework and the communication paths may have various configurations and/or combinations of hardware, software, firmware, etc., suitable for performing the functions described herein without departing from the teachings of the present disclosure.

The XR framework 102 may generate a virtual environment 140 including virtual scenery and various virtual objects and representations of participating users and user devices. The virtual environment 140 may be modeled based on a physical location or setting (e.g., a café, a concert venue, an arena, a sport venue, etc.). In some instances, the virtual environment 140 may be modeled based on a fictional location or setting (e.g., a sci-fi environment, a historical setting, a futuristic setting, a fantasy world, an imaginary landscape, etc.). As shown in FIG. 1, the virtual environment 140 is a meeting room where coworkers might meet virtually to collaborate about on a project. A participating user may be represented by an avatar chosen by the user or by an image of the user themselves. A participating user device may be represented by a digital twin of the user device, a virtual twin of the user device, or any other form selected by the XR framework 102 or a user associated with the user device. Also of note is that the users, along with their XR devices and other associated devices, need not be physically in the same location outside of the virtual environment. For example, the XR device 104 may be located in Vancouver, the XR device 106 may be located in Chicago, and the XR device 108 may be located in London. As another example, each XR device 104, 106, 108 may be located on different floors of the same office building. In some embodiments, the XR device worn by the user to interact with the virtual environment may be in a different physical location than the user device associated with that same user.

The XR framework 102 creates associations between users and devices within the virtual environment 140. Each XR device 104, 106, 108 may be associated with a user profile (labeled User A1, User B1, and User C1, respectively) and one of the avatars 142, 144, 146 in the virtual environment 140. Each avatar 142, 144, 146 digitally represents the user of each respective XR device 104, 106, 108 based on information from the respective user profiles. Each user device 110, 112 is likewise associated with one of the avatars 142, 144 in the virtual environment 140. User devices 110, 112 are represented in the virtual environment 140 by a respective interactive virtual twin 150, 152. Each interactive virtual twin 150, 152 is a virtual representation of the respective user device 110, 112, including the displays 154, 156 of each respective user device 110, 112. Each interactive virtual twin 150, 152 therefore presents a virtual display 160, 162 that visually reproduces the display 154, 156 of each user device 110, 112. In some embodiments, each interactive virtual twin 150, 152 may be based on the primary display of the respective user device 110, 112, such as the display screen of a smart phone or tablet computer, or an LED display screen connected to a laptop computer or desktop computer. In some embodiments, each interactive virtual twin 150, 152 may be based on a secondary display of the respective user device 110, 112, even if that secondary display is not being actively displayed on a screen by the user device 110, 112 outside of the virtual environment 140.

In some embodiments, the XR framework may be configured to generate one or more of the virtual displays 160, 162 as a simplified interface for the functions, processes, and/or applications that are available on the user devices 110, 112. In such embodiments, the simplified interface may be displayed to and used by the XR device users instead of replicating one or both of the displays 154, 156 of the user devices 110, 112 as the virtual displays 160, 162. In some embodiments with such a simplified interface, the XR framework may include only those functions, processes, and/or applications on the user devices 110, 112 that are compatible with the virtual environment, excluding those that aren't. In some embodiments with such a simplified interface, the XR framework may be configured to include virtual functions in a simplified interface, with each virtual function having a one-to-many correspondence with functions, processes, and applications that are available on one of the user devices 110, 112. Each such virtual function may be presented to the XR device users as a single selectable function within the virtual environment, and some virtual functions may be presented to the XR device users as part of an interface that is not visually incorporated into the virtual displays 160, 162. In embodiments with virtual functions, when an XR device user interacts with a virtual function, the virtual function is translated into operational instructions that instruct one of the user devices 110, 112 to execute more than one user device function, process, and/or application.

In some embodiments with virtual functions and multiple connected user devices 110, 112, a virtual function may have a one-to-many correspondence with functions, processes, and applications that are available on both user devices 110, 112. In such embodiments, when an XR device user interacts with such a virtual function, the virtual function is translated into operational instructions that may instruct both user devices 110, 112 to execute one or more user device function, process, and/or application.

The process flows of any of FIGS. 6-8 (described below) may be configured to be integrated into a simplified interface as part of a virtual twin or otherwise within the virtual environment. For example, the process flow of FIG. 6 may be configured as part of a simplified interface, such that each interaction of the XR device user to edit a photo is combined with a save function. For example, the process flow of FIG. 7 may be configured as part of a simplified interface, such that an XR device user may interact with a single virtual function to transfer a file from one user device to another and have that file automatically saved on the receiving user device. For example, the process flow of FIG. 8 may be configured as a virtual function, such that one XR device user interacting with the virtual function may initiate synchronous display of a movie using multiple user devices connected to the virtual environment.

In some embodiments, the portions of the interactive virtual twins 150, 152 around the respective virtual display 160, 162 may be customized by the user associated with each respective virtual twin 150, 152. In such embodiments, the customization may include color, skins, images, and the like shown over portions of the respective virtual twin 150, 152, exclusive of the virtual displays 160, 162.

Each XR device 104, 106, within the virtual environment 140, is also associated with the respective user device 110, 112 to which each is linked. User device 114 does not have a virtual twin within the virtual environment 140, and therefore user device 114 is not bridged or associated with any user device by the XR framework 102. However, each user device 110, 112, 114 is linked with the network 136, and through the network 136, each user device 110, 112, 114 may establish a link with each of the other user devices 110, 112, 114 outside of the virtual environment 140.

In some embodiments, the XR framework 102 may also generate virtual representations of other devices (not shown) associated with any of the XR devices 104, 106, 108. Such other devices may include speakers, game controllers, keyboards, and the like.

Actions of the avatars 142, 144, 146 in the virtual environment 140 may be controlled via the XR devices 104, 106, 108 using a control device (e.g., a gaming control device), not shown, linked to the respective XR device 104, 106, 108 outside of the virtual environment 140. Indicators 168 may be displayed in the virtual environment 140 to indicate the corresponding user/XR device identifiers 170, 172, 174 for the avatars 142, 144, 146. In addition, indicators 166 may be displayed in the virtual environment 140 to indicate the corresponding user device identifiers 176, 178.

In this scenario 100, the XR framework 102 may generate the virtual environment 140 to include virtual representations of any one or more of the users, the XR devices, the user devices, avatars representing the users. In some embodiments, a user may view the virtual environment 140 through the point-of-view of that user's avatar. In some embodiments, a user may view the virtual environment 140 from an out-of-avatar perspective (i.e., a point of view that is from a position other than the position of that user's avatar within the virtual environment 140). In some embodiments, one user may view the virtual environment 140 from the point-of-view of that user's avatar, while another user may view the virtual environment from an out-of-avatar perspective. In some embodiments, the point-of-view shown to a user is determined by the user. In some embodiments, the point-of-view shown to a user is determined by the XR framework 102. For example, the XR devices 104, 106, 108, via their respective display screens, may each present the respective users with the point-of-view as shown in the virtual environment 140. For example, each XR device 104, 106, 108 may display a respective viewpoint of the virtual environment 140 from the position of the respective avatar 142, 144, 146. In some embodiments, the XR framework 102 may generate the viewpoints and transmit the corresponding graphical data to be presented at respective displays of the XR devices 104, 106, 108. In some embodiments, the XR devices 104, 106, 108 generate the avatars 142, 144, 146 and their respective viewpoints, and the XR framework 102 generates all other aspects, including virtual objects, of the virtual environment 140. The XR framework 102 may transmit relevant point-of-view information for the XR devices 104, 106, 108 to update the respective viewpoints of the avatars 144, 144, 146.

In some embodiments, the XR framework 102 may include an XR environment system for generating the virtual environment 140 and XR content in the virtual environment 140. For example, the XR framework 102 may include an XR engine that generates the virtual environment 140 and representations for various digital assets of the virtual environment 140. In some embodiments, the XR framework 102 is communicatively coupled to an XR environment engine. The XR framework 102 may provide instructions to the XR environment engine, based on activities/events in the virtual environment 140, that cause the XR environment engine to perform some or all the actions to generate, update, and maintain the virtual environment 140 (e.g., 3D modeling, asset processing, graphics processing, environment updating, etc.). The XR framework 102 may communicate the virtual environment 140, or frames thereof, to XR devices 104, 106, 108 for display to the users.

Continuing the scenario 100, the XR framework 102 determines that the XR devices 104, 106, 108 are virtually proximate within the virtual environment 140. For example, in circumstances when the avatars 142, 144, 146 are within the same space within the virtual environment 140, the XR devices 104, 106, 108 are considered virtually proximate. Additionally, or alternatively, in circumstances when the avatars 142, 144, 146 or the XR devices 104, 106, 108, exchange a virtual handshake or other interaction within the virtual environment 140, the XR devices 104, 106, 108 are considered virtually proximate. For example, the XR devices 104, 106, 108 may exchange connection information including transfer rate, coding alphabet, parity, interrupt procedure, various security measures, etc. For example, the devices may exchange protocol data for initiating communications in the virtual environment 140. In some embodiments, exchanging the protocol data may include exchanging user identifiers. For example, if the virtual environment 140 is a virtual social space (e.g., a social media platform), the XR devices 104, 106, 108 may exchange usernames, enabling social communication between the avatars 142, 144, 146 in the virtual environment 140 (e.g., a friend request), which may be indicative of the devices being virtually proximate. In some embodiments, the XR framework 102 may define virtual proximity using other indicia, such as by setting a virtual proximity threshold around avatars, defining a space by boundaries (e.g., virtual walls, a table, or other visible demarcations) within the virtual environment, such that when two avatars are within the defined space, they are virtually proximate.

The interactive virtual representations 150, 152 of the user devices 110, 112 generated in the virtual environment 140 by the XR framework 102 are based on device information provided by the user devices 110, 112. The XR framework 102 may access device information for the user devices 110, 112 via the communication paths 125, 127 or directly via the communication paths 126, 128 if links through these communication paths 126, 128 are established. Examples of device information may include device make, device model, serial number, media access control (MAC) address, IP address, geolocation data, advertising ID, available applications, software version, firmware version, operating system information, etc. The XR framework 102 may determine a virtual representation of the user devices 110, 112 by, for example, accessing a database comprising a plurality of devices and associated information and identifying specifications (e.g., dimensions, size, weight, screen size, etc.) for the user devices 110, 112 based on the device information such as the make, model, and serial number. The XR framework 102 may generate the virtual twins 150, 152 based on the specifications and position the virtual twins 150, 152 in virtual proximity to the respective associated avatars 142, 144 in the virtual environment 140. The virtual twins 150, 152 may be generated with indicators 166 (e.g., device IDs) for identification purposes within the virtual environment 140. In some embodiments, the indicators 166 may also be indicative of the status of each virtual twin 150, 152 by including, for example, a status identifier. Examples of status identifiers include active, inactive, sleep mode, linked, discoverable, etc. The indicators 166 may include icons or other graphical elements (e.g., a green/red light, an animation, a spinning circle, etc.) to represent the status identifier.

Referring to scenario 100, the XR framework 102 communicates with the user devices 110, 112 so that a display screen from each user device 110, 112 may be displayed as part of the respective virtual twin 150, 152. This communication between the XR framework 102 and the user devices 110, 112 may respectively occur over the communication paths 125, 127 and/or over the communication paths 126, 128. Through communications between the XR framework 102 and the user devices 110, 112, the XR framework 102 determines the appearance that each virtual twin 150, 152 should have within the virtual environment 140 and establishes control mechanisms for each virtual twin 150, 152 within the virtual environment 140. Because each virtual twin 150, 152 is generated with a representation of a display screen from the respective user device 110, 112, the control mechanisms may be established to mimic how users interact with the user devices 110, 112 outside of the virtual environment 140. For example, in instances where one of the user devices 110, 112 is a smart phone with a touch screen, control mechanisms may be established by the XR framework 102 which allow the avatars 142, 144, 146 to interact with the respective virtual twin 150, 152 by simulating interactions with a touch screen. The control mechanisms may simulate actions such as a single tap on a touch screen, a double tap on a touch screen, a tap and hold action on a touch screen, and a tap and drag action on a touch screen, among others. As another example, in instances where one of the user devices 110, 112 is a laptop computer with a keyboard and a track pad, control mechanisms may be established by the XR framework 102 which allow the avatars 142, 144, 146 to interact with the respective virtual twin 150, 152 by simulating interactions with a keyboard and with a trackpad. As yet another example, in instances where one of the user devices 110, 112 is a tablet computer with a keyboard, control mechanisms may be established by the XR framework 102 which allow the avatars 142, 144, 146 to interact with the respective virtual twin 150, 152 by simulating interactions with a touch screen and with a keyboard.

Within the virtual environment 140, the avatars 142, 144, 146 may interact with one or more of the virtual twins 150, 152 through the control mechanisms, and from such interactions, the control mechanisms generate control input. The XR framework 102 receives the control input and generates operational instructions based on the control input. In some embodiments, there may be a one-to-one correspondence between the control input and the operational instructions. The operational instructions are configured to instruct the respective user device 110, 112 to perform specified functions, the functions being based on the control input. The XR framework 102 communicates the operational instructions to the user device 110, 112 corresponding to the virtual twin 150, 152 with which one or more of the avatars 142, 144, 146 interacted in the virtual environment 140. Communications of the operational instructions are performed using one of the communication paths (e.g., 125, 126, 127, 128) established between the XR framework 102 with the respective user device 110, 112. The operational instructions are communicated to the respective user device 110, 112 in real time so that the respective user device 110, 112 may perform functions based on the operational instructions, the respective display 154, 156 may be updated following performance of the operational instructions, and subsequently the respective virtual display 160, 162 may be updated based on the updated display 154, 156.

In some embodiments, the operational instructions are generated as executable code that may be executed by one of the user devices 110, 112 to perform functions that correspond to the simulated interactions of the avatars 142, 144, 146. In some embodiments, the operational instructions are generated as a scripting language code that may be interpreted by one of the user devices 110, 112 to perform functions that correspond to the simulated interactions of the avatars 142, 144, 146. In some embodiments, one or both user devices 110, 112 may include an application programming interface (API) configured to receive operational instructions from the XR framework 102. In such embodiments the operational instructions are generated in a form and format appropriate to be received and interpreted by the API to cause the respective user device 110, 112 to perform functions that correspond to the simulated interactions of the avatars 142, 144, 146.

In some embodiments, one or more of the user devices 110, 112 may inject content directly into the virtual environment 140 via the communication paths 125, 127 for display as part of the respective virtual twin 150, 152. In such embodiments, the directly injected media bypasses the XR framework 102 and is overlaid on the virtual twin 150, 152 by the associated XR device 104, 106. Metadata related to the injected media may be communicated from the user devices 110, 112 to the XR framework 102 through any of communication paths 125-128, respectively. Depending on the type of injected media, the media may be overlaid on the entirety of the virtual screen 160, 162 of the respective virtual twin 150, 152, or the media may be overlaid on only a part of the virtual screen 160, 162. By directly injecting media into the virtual environment 140 from the user devices 110, 112, the processing power of the user devices 110, 112 may be used in conjunction with the XR devices 104, 106 to aid in the display of process or memory intensive media (e.g., video, content having large memory footprints, and other high bit depth media) within the virtual environment 140. At the same time, by communicating metadata related to injected media to the XR framework 102, the XR framework 102 may continue to control the virtual environment 140 while also offloading potentially processing intensive tasks to the user devices 110, 112. This offloading of processing can be particularly beneficial in instances where the user devices 110, 112 include processors that are optimized for performing such intensive tasks (e.g., video editing, image editing, sound editing, and live video communications, and many more).

For example, in the scenario 100, the user of XR device 104 and the user of XR device 106 may wish to watch a streaming movie within the virtual environment 140. Having the user devices 110, 112 directly inject the movie into the virtual environment 140 for each user via the respective XR device 104, 106 offloads processing tasks to the user devices 110, 112 and saves the XR framework 102 from having to process and display the movie. The XR framework 102 processes the metadata for purposes of continuing to control the virtual environment, which is a lighter processing load. In instances where the injected media is a streaming movie, the metadata may serve to aid the XR device 102 in synchronizing the movie-watching experience so that the users may have a more enjoyable time watching the movie within the virtual environment 140.

The processing load of the XR framework 102 may be further lightened by offloading to the user devices 110, 112 tasks that may be performed by specialized applications. Some of these tasks may not otherwise be available from within the virtual environment 140 because there isn't sufficient demand for applications performing such tasks to be developed for use within the virtual environment. Smartphones, tablet computers, and personal computers often include specialized applications that users access regularly to perform tasks every day. Such applications may include web browsers, messaging applications, telephone call applications, media editing applications, social networking applications, and email applications, among many more.

Figure 2:
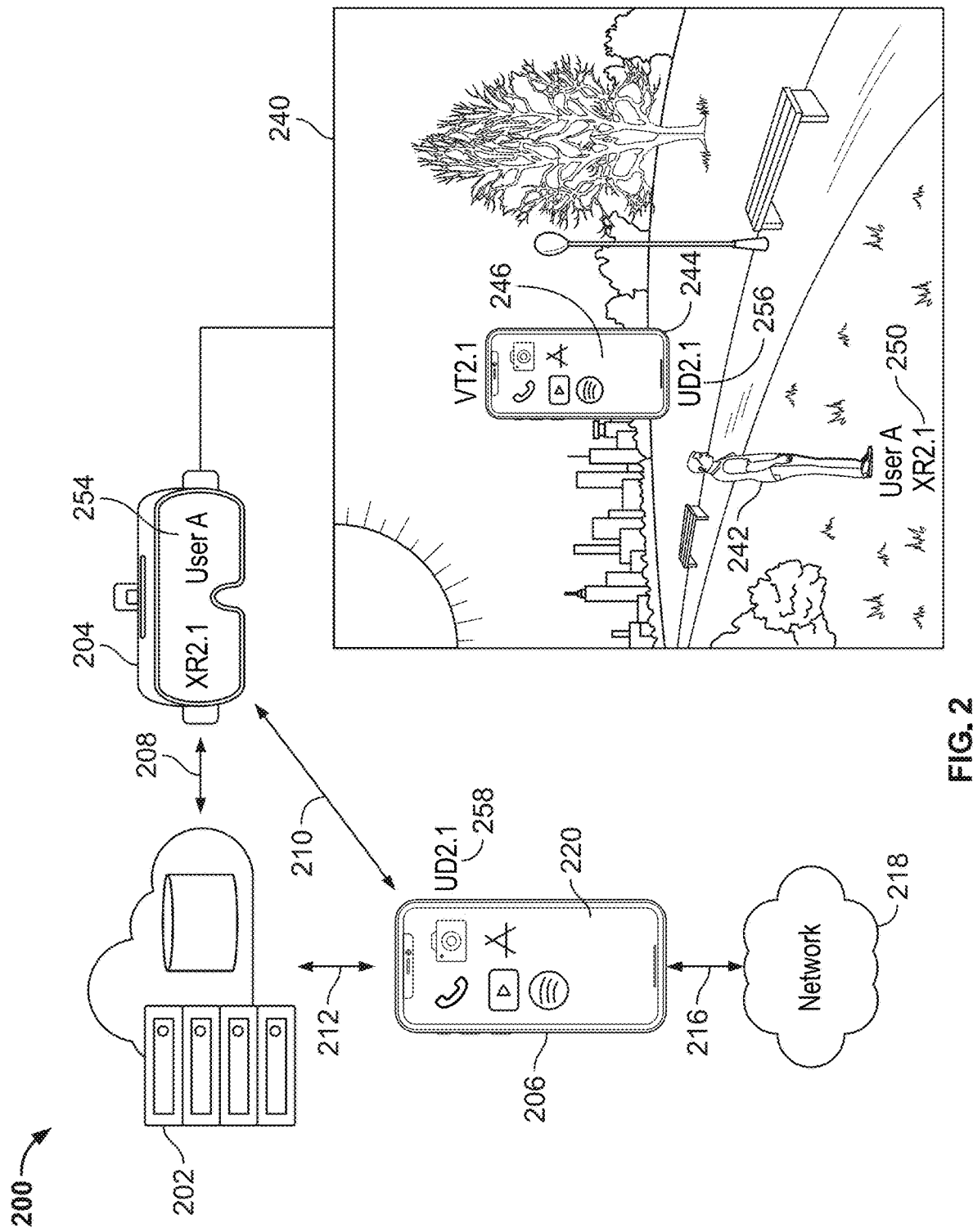
FIG. 2 shows another exemplary environment in which an XR framework bridges an extended reality device and a user device via a virtual environment, in accordance with some embodiments of this disclosure.

FIG. 2 shows an example scenario 200 of an XR framework 202 bridging virtually proximate devices, namely the XR device 204 (labeled as XR2.1) and the user device 206 (labeled as UD2.1), to enable a user to control content from within the virtual environment 240. The XR device 204 includes a display screen for presenting the virtual environment 240 to the user wearing the XR device 204. In some embodiments, the XR device 204 may be an XR head-mounted device (HMD) or other wearable device for interacting with the XR environment 240. In this scenario 200, the XR framework 202 generates the virtual environment 240, and the XR device 204 enables the wearer to engage with the virtual environment 240. The user device 206 includes a display screen 220, and as discussed in greater detail below, the XR framework 202 generates a virtualized version of the user device 206 and the display screen 220 within the virtual environment 240. This scenario 200 helps illustrate advantages that may be achieved when a user is able to interact with the virtual representation of a single user device within the virtual environment 240.

The virtual environment 240 may include virtual scenery, various virtual objects, and representations of the participating user and that user's associate user device. The virtual environment 240 may be modeled based on a physical location or setting, or alternatively it may be modeled based on a fictional location or setting. As shown in FIG. 2, the virtual environment 240 is an outdoor scene in a meadow adjacent a lake and forest. Within this virtual environment, a participating user may be represented by an avatar chosen by the user or by an image of the user themselves. A participating user device may be represented by a digital twin of the user device, a virtual twin of the user device, or any other form selected by the XR framework 202 or a user associated with the user device. Although not shown, other user devices may be represented in the virtual environment 240, including speakers, game controllers, keyboards, and the like.

In this scenario 200, the XR framework 202 is communicably linked to the XR device 204 via the communication path 208. The user device 206 is associated with and communicably linked to the XR device 204 through the communication path 210. This communication path 210 may also be used for communications between the XR framework 202 and the user device 206. The XR framework 202 may also be communicably linked to the user device 206 directly via the communication path 212. In some embodiments, the communication path 212 between the XR framework 202 and the user device 206 may be omitted. Also in this scenario 200, the user device 206 is communicably linked to the network 218 via the communication path 216, and the network 218 enables the user device 206 to establish communication links with other devices (e.g., servers and other networked programmable devices) linked to the network 218. Each of the communication paths identified herein (e.g., 208-216) may include a plurality of paths, networks, intervening nodes, edge servers, etc. Further, each of the communication paths are described herein as single paths for conciseness, and this description is intended to be non-limiting. In bridging the XR device 204 and the user device 206, the XR framework 202 may establish additional communication paths between devices (e.g., a virtual connection), any of which may include portions of communication paths 208-216.

The XR framework 202 creates associations between users and devices within the virtual environment 240. The XR device 204 is associated, within the virtual environment 240, with the user device 206. The XR device 204 may be associated with a user profile (labeled User A) and the avatar 242 in the virtual environment 240. The avatar 242 digitally represents the user of the XR device 204 based on information from the user profile. The user device 206 is likewise associated with the avatar 242 in the virtual environment 240. The user device 206 is represented in the virtual environment 240 by an interactive virtual twin 244 which is a virtual representation of the user device 206, including the virtual display 246. The interactive virtual twin 244 therefore presents a virtual display 246 that virtually reproduces, and mirrors, the display 220 of the user device 206. In some embodiments, the interactive virtual twin 244 may be based on the primary display of the user device 206, such as the display screen of a smart phone or tablet computer, or an LED display screen connected to a laptop computer or desktop computer. In some embodiments, the interactive virtual twin 244 may be based on a secondary display of the user device 206, even if that secondary display is not being actively displayed on a display screen by the user device 206 outside of the virtual environment 240. In some embodiments, the portions of the interactive virtual twin 244 around the virtual display 244 may be customized by the user associated with each respective virtual twin 244. In such embodiments, the customization may include color, skins, images, and the like, shown over non-interactive portions of the respective virtual twin 244.

Actions of the avatar 242 in the virtual environment 240 may be controlled via the XR device 204 using a control device (e.g., a gaming control device), not shown, linked to the XR device 204 outside of the virtual environment 240. Indicators 250 may be displayed in the virtual environment 240 to indicate the user/XR device identifier 254 associated with the avatar 242. In addition, an indicator 256 may be displayed in the virtual environment 240 to indicate the user device identifier 258.

In this scenario 200, the XR framework 202 may generate the virtual environment 240 to include virtual representations of any one or more of the users, the XR devices, the user devices, avatars representing the users. In some embodiments, a user may view the virtual environment 240 through the point-of-view of that user's avatar. In some embodiments, a user may view the virtual environment 240 from an out-of-avatar perspective (i.e., a point of view that is from a position other than the position of that user's avatar within the virtual environment 240). In some embodiments, the point-of-view shown to a user is determined by the user. In some embodiments, the point-of-view shown to a user is determined by the XR framework 202. For example, the XR device 204, via the display screen, may present the user with the point-of-view as shown in the virtual environment 240. For example, the XR device 204 may display a viewpoint of the virtual environment 240 from the position of the avatar 242. In some embodiments, the XR framework 202 may generate the viewpoint and transmit the corresponding graphical data to be presented at the display of the XR device 204. In some embodiments, the XR device 204 generates the avatar 242 and the viewpoint, and the XR framework 202 generates all other aspects, including virtual objects, of the virtual environment 240. The XR framework 202 may transmit relevant point-of-view information for the XR device 204 to update the viewpoint of the avatar 242.

In some embodiments, the XR framework 202 may include an XR environment system for generating the virtual environment 240 and XR content in the virtual environment 240. The XR framework 202 with the XR environment system may function as described above in connection with FIG. 1.

Continuing the scenario 200, the interactive virtual twin 244 of the user device 206 that is generated in the virtual environment 240 by the XR framework 202 is based on device information provided by the user device 206. The XR framework 202 may access device information for the user device 206 via the communication paths 210 or directly via the communication path 212 if links through this communication path 212 is established. Examples of device information may include device make, device model, serial number, media access control (MAC) address, IP address, geolocation data, advertising ID, available applications, software version, firmware version, operating system information, etc. The XR framework 202 may determine a virtual representation of the user device 206 by, for example, accessing a database comprising a plurality of devices and associated information and identifying specifications (e.g., dimensions, size, weight, screen size, etc.) for the user device 206 based on the device information such as the make, model, and serial number. The XR framework 202 may generate the virtual twin 244 based on the specifications and position the virtual twin 244 in virtual proximity to the associated avatar 242 in the virtual environment 240. The virtual twin 244 may be generated with an indicator 256 (e.g., device ID) for identification purposes within the virtual environment 240. In some embodiments, the indicator 256 may also be indicative of the status of the virtual twin 242 by including, for example, a status identifier. Examples of status identifiers include active, inactive, sleep mode, linked, discoverable, etc. The indicator 256 may include icons or other graphical elements (e.g., a green/red light, an animation, a spinning circle, etc.) to represent the status identifier.

Referring to the scenario 200, the XR framework 202 communicates with the user device 206 so that the display screen 220 from the user device 206 may be displayed as part of the virtual twin 244. This communication between the XR framework 202 and the user device 206 may occur over the communication path 210 and/or over the communication path 212. Through communications between the XR framework 202 and the user device 206, the XR framework 202 determines the appearance that the virtual twin 244 should have within the virtual environment 240 and establish control mechanisms for the virtual twin 244 within the virtual environment 240. Because the virtual twin 244 is generated with a representation of a display screen from the user device 206, the control mechanisms are established to mimic how the user interacts with the user device 206 outside of the virtual environment 240. Such control mechanisms may be similar to those discussed above in connection with FIG. 1.

Within the virtual environment 240, the avatar 242 may interact with the virtual twin 244 through the control mechanisms, and from such interactions, the control mechanisms generate control input. The XR framework 202 receives the control input and generates operational instructions based on the control input. The operational instructions may be generated and communicated to the user device 206 in any of the manners discussed above in connection with FIG. 1. The operational instructions are configured to instruct the user device 206 to perform specified functions, the functions being based on the control input. In some embodiments, there may be a one-to-one correspondence between the control input and the operational instructions. The XR framework 202 communicates the operational instructions to the user device 206, and these communications are performed using one of the communication paths (e.g., 210, 210) established between the XR framework 202 with the user device 206. The operational instructions are communicated to the user device 206 in real time so that the user device 206 may perform functions based on the operational instructions, the display 220 may be updated following performance of the operational instructions, and subsequently the virtual display 246 may be updated to reflect the updated display 220.

In some embodiments, the user device 206 may inject content directly into the virtual environment 240 via the communication path 208 for display as part of the virtual twin 244. In such embodiments, the directly injected media bypasses the XR framework 202 and is overlaid on the virtual twin 244 by the XR device 204. Metadata related to the injected media may be communicated from the user device 206 to the XR framework 202 through the communication paths 210, 212, respectively. Depending on the type of injected media, the media may be overlaid on the entirety of the virtual screen 246 of the virtual twin 244, or the media may be overlaid on only a part of the virtual screen 246. By directly injecting media into the virtual environment 240 from the user device 206, the processing power of the user device 206 may be used in conjunction with the XR devices 104, 106 to aid in the display of process or memory intensive media (e.g., video, content having large memory footprints, and other high bit depth media) within the virtual environment 240. At the same time, by communicating metadata related to injected media to the XR framework 202, the XR framework 202 may continue to control the virtual environment 240 while also offloading potentially processing intensive tasks to the user device 206. This offloading can be particularly beneficial in instances where the user device 206 includes one or more processors that are optimized for performing such intensive tasks (e.g., video editing, image editing, sound editing, and live video communications, and many more).

In some embodiments, the processing load of the XR framework 202 may be lightened by offloading to the user device 206 tasks that may be performed by specialized applications. Some of these tasks may not otherwise be available from within the virtual environment 240 because there isn't sufficient demand for applications performing such tasks to be developed for use within program the virtual environment. Smartphones, tablet computers, and personal computers often include specialized applications that users access regularly to perform tasks every day. Such applications may include web browsers, messaging applications, telephone call applications, media editing applications, social networking applications, and email applications, among many more.

Figure 3:
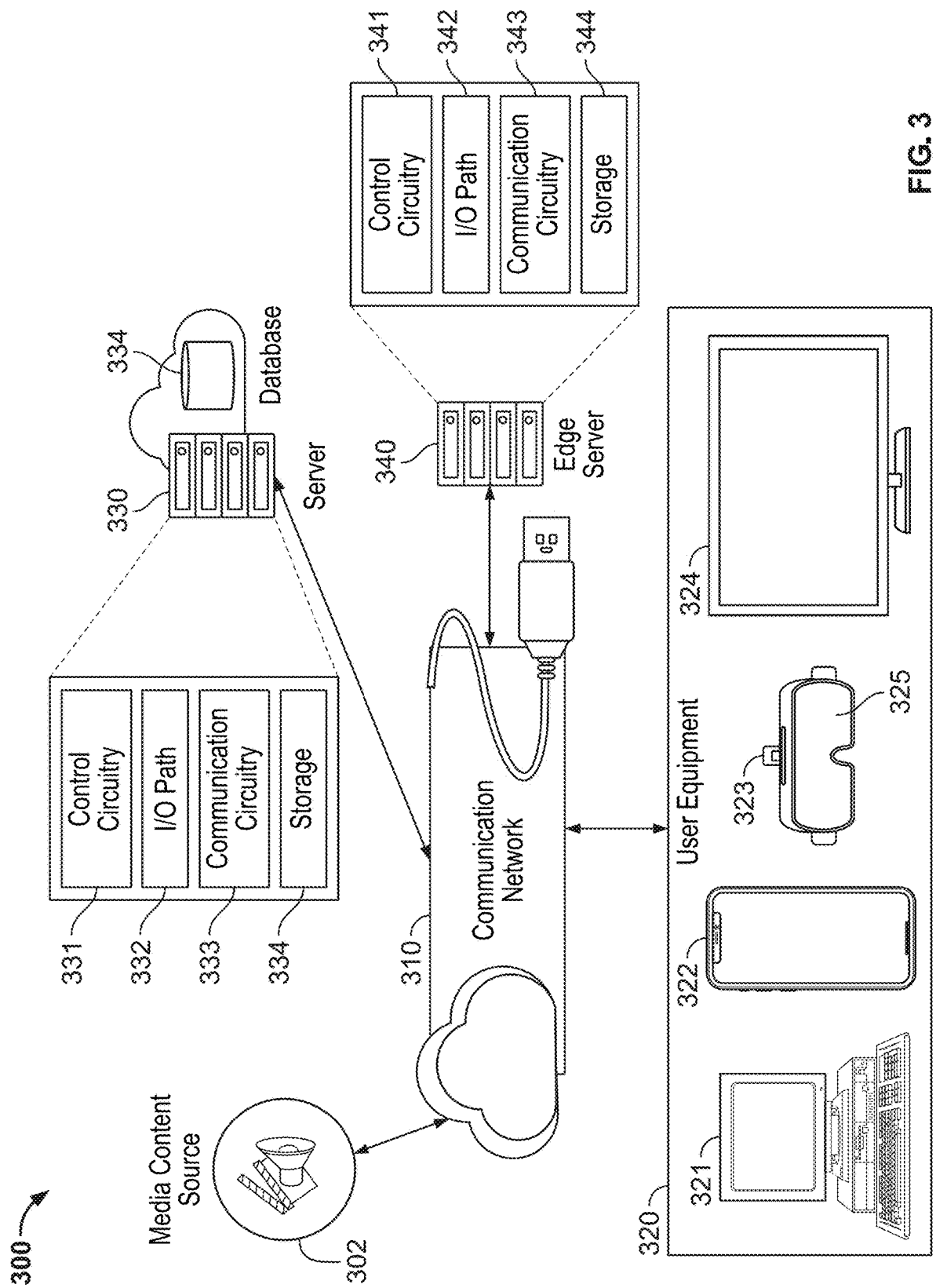
FIG. 3 shows an illustrative system for enabling interaction with a user device from within a virtual environment, in accordance with some embodiments of this disclosure.

FIG. 3 shows an illustrative system 300 for controlling content from within a virtual environment, in accordance with some embodiments of this disclosure. The system 300 may include components for generating and providing XR content (e.g., encoder, decoder, network components, content delivery networks (CDN), etc.). The system 300 may include one or more media content source 302, one or more servers 330, and one or more edge servers 340 (e.g., included as part of an edge computing system). The system 300 may include user equipment devices 320 (e.g., devices 321-324) and/or any other suitable number and types of user equipment capable of transmitting data via the communication network 310.

The media content source 302, the server 330, or the edge server 340, or any combination thereof, may include one or more content processing devices (e.g., an encoder, graphics processing devices, etc.). The content processing devices may comprise any suitable combination of hardware and/or software configured to process data to reduce storage space required to store the data and/or bandwidth required to transmit the image data, while minimizing the impact on the quality of the content being processed. In some embodiments, the data may comprise raw, uncompressed extended reality (3D and/or 4D) media content, or extended reality (3D and/or 4D) media content in any other suitable format. In some embodiments, each of the user equipment devices 320 may receive processed data locally or over a communication network (e.g., communication network 310). In some instances, the devices 320 may comprise one or more converters (e.g., a decoder). Such a converter may comprise any suitable combination of hardware and/or software configured to convert received data to a form that is usable as video signals and/or audio signals or any other suitable type of data signal, or any combination thereof. User equipment devices 320 may be provided with processed data and may be configured to implement one or more machine learning models to obtain an identifier of an element in a data structure and/or render a color for a particular voxel based on the identified element. In some embodiments, at least a portion of processing may be performed remote from any of the user equipment devices 320.

User equipment devices 320 may include an illustrative head-mounted display 323 or any other suitable XR device capable of providing XR content for user consumption. User equipment devices 320 may also include additional devices which are to be incorporated into the XR content through virtual representation. Each of the user equipment devices 320 may access, transmit, receive, and/or retrieve content and data via one or more I/O paths coupled to the respective equipment using corresponding circuitry. Such content data may include XR content, or portions thereof, for user consumption, and the content data may also include media content that is to be incorporated as part of the XR content. As an illustrative example based on the device 323, a path to/from the communication network 310 may provide content (e.g., broadcast programming, on-demand programming, Internet content, content available over a local area network (LAN) or wide area network (WAN), and/or other content) and data to control circuitry and/or communication circuitry of the device 323. In some embodiments, control circuitry of the device 323 may be used to send and receive commands, requests, content, and other suitable data using the path to/from the communication network 310 and the communication circuitry of the device 323. Such a path may communicatively couple control circuitry of the device 323 to one or more other communication paths. I/O functions may be provided by one or more of these communication paths but may be shown as a single path to avoid overcomplicating the drawing. One or more of the user equipment devices 320 may include or be coupled to a display device 325. In some embodiments, the display device 325 may comprise an optical system of one or more optical elements such as a lens in front of an eye of a user, one or more waveguides, or an electro-sensitive plane. For example, the user equipment devices 320 may include an illustrative head-mounted display or any other suitable XR device capable of providing XR content for user consumption and is further described with respect to FIG. 4.

In some embodiments, an application of an XR framework may be executed at one or more of the control circuitry 331 of the server 330 and/or control circuitry of the user equipment devices 320 and/or the control circuitry 341 of the edge servers 340. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Any device, equipment, etc. described herein may comprise control circuitry. The server 330 may be coupled to a database 334. In some embodiments, one or more data structures discussed herein may be stored at the database 334. The data structures may be maintained at or otherwise associated with the server 330, and/or at the storage 334 and/or at storage of one or more of the user equipment devices 320. The communication network 310 may comprise one or more networks including the Internet, a mobile phone network, a mobile voice or data network (e.g., a 5G, 4G, or LTE network), cable network, public switched telephone network, or other types of communication network or combinations of communication networks. Communication paths (e.g., depicted as arrows connecting the respective devices to the communication network 310) may separately or together include one or more distinct communication paths, such as a satellite path, a fiber-optic path, a cable path, a path that supports Internet communications (e.g., IPTV), free-space connections (e.g., for broadcast or other wireless signals), or any other suitable wired or wireless communication path or combination of such communication paths. Communications with the client devices may be provided by one or more of these communication paths but may be shown as a single path to avoid overcomplicating the drawing. Although communication paths may not be shown between user equipment devices 320, the individual devices may communicate directly with each other via one or more communication paths as well as other short-range, point-to-point communication paths, such as USB cables, IEEE 1394 cables, wireless paths (e.g., Bluetooth, infrared, IEEE 802-11x, etc.), or other short-range communication via wired or wireless paths. The user equipment devices may also communicate with each other directly through an indirect path the via communication network 310.

In some embodiments, an XR framework may include a client/server application where only the client application resides on one or more user equipment devices 320, and a server application resides on an external server. For example, an XR framework may be implemented partially as a client application on control circuitry of a user equipment device 323 and partially on the server 330 as a server application running on control circuitry 331. The server 330 may be part of a local area network or may be part of a cloud computing environment accessed via the Internet. In a cloud computing environment, various types of computing services for performing searches on the Internet or informational databases, generating virtualized components, providing encoding/decoding capabilities, providing storage (e.g., for a database), or processing and parsing data (e.g., using machine learning algorithms described above and below) are provided by a collection of network-accessible computing and storage resources (e.g., the server 330 and/or the edge server 340), referred to as "the cloud." For example, the user equipment devices 320 may include a cloud client that relies on the cloud computing capabilities from the server 330 to receive and process data for XR content. When executed by control circuitry of the server 330 and/or the edge server 340, an XR framework, or parts thereof, may instruct the control circuitry 331 and/or the control circuitry 341 to perform processing tasks for the user equipment devices 320 and facilitate execution of the various processes.

In some embodiments, the server 330 may include control circuitry 331 and storage 334 (e.g., RAM, ROM, hard disk, removable disk, etc.). The storage 334 may store one or more databases. The server 330 may also include an input/output (I/O) path 332 with associated communication circuitry 333. The I/O path 332 may provide protocol exchange data, device information, or other data, over a local area network (LAN) or wide area network (WAN), and/or other content and data to the control circuitry 331, which may include processing circuitry, and the storage 334. The control circuitry 331 may be used to send and receive commands, requests, and other suitable data using the I/O path 332, which may comprise I/O circuitry. The I/O path 332 may connect the control circuitry 331 to one or more communication paths.

The edge computing server 340 may include control circuitry 341, an I/O path 342 with associated communication circuitry 343, and storage 344, which may be implemented in a similar manner as the control circuitry 331, the I/O path 332, communication circuitry 333, and the storage 344, respectively, of the server 330. The edge server 340 may be configured to be in communication with one or more of the user equipment devices 320 (e.g., devices 321-324) and/or a video server (e.g., server 330) over the communication network 310 and may be configured to perform processing tasks (e.g., encoding/decoding) in connection with ongoing processing of video data. In some embodiments, a plurality of edge servers 340 may be strategically located at various geographic locations and may be mobile edge servers configured to provide processing support for mobile devices at various geographical regions.

The control circuitry 331, 341 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, the control circuitry 331, 341 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 331, 341 executes instructions for an emulation system application stored in memory (e.g., the storage 334, 344). Although not shown, memory may be an electronic storage device provided as the storage 334, 344 that is part of the respective control circuitry 331, 341.

Figure 4:
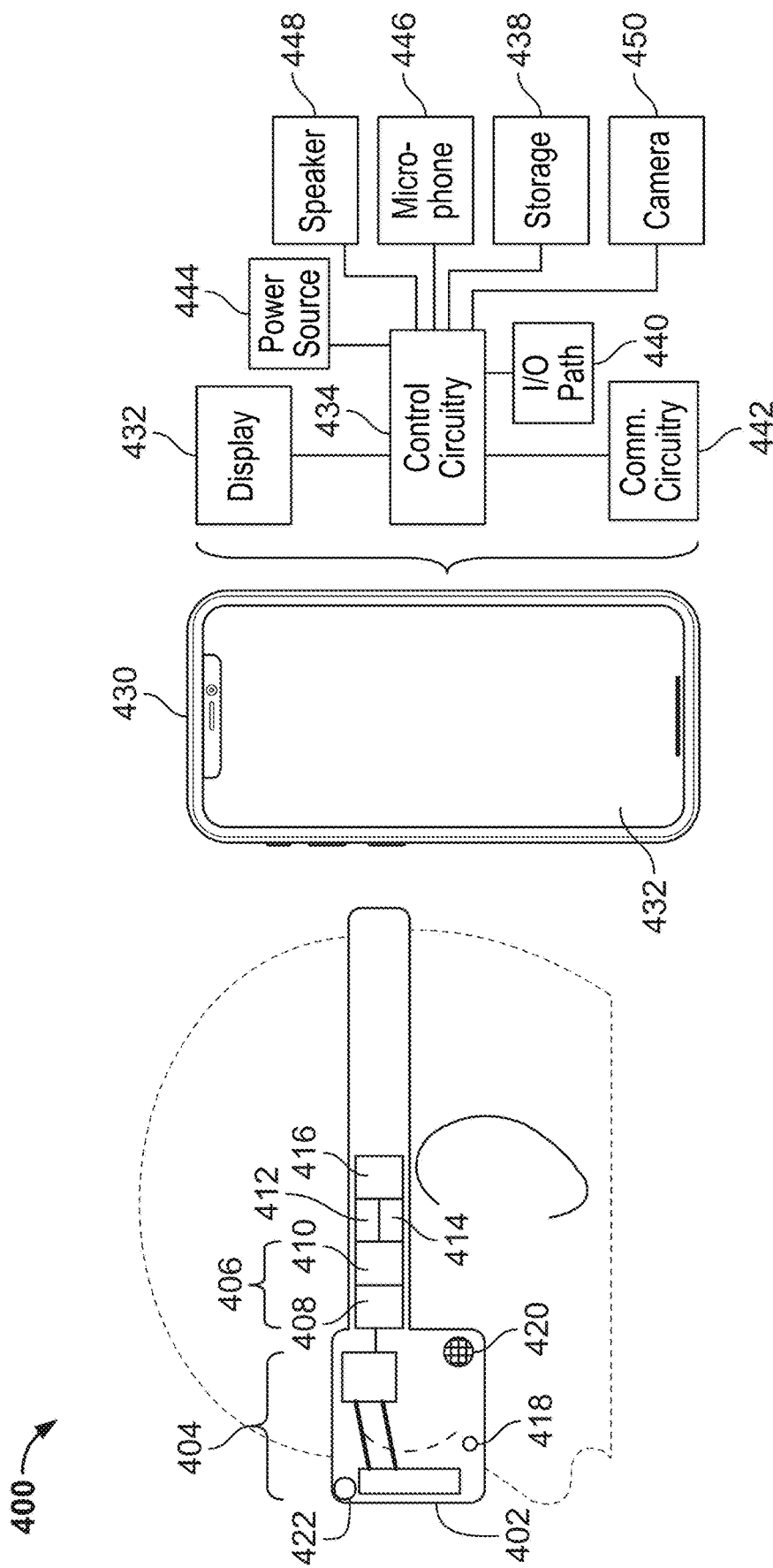
FIG. 4 shows illustrative user equipment for enabling interaction with a user device from within a virtual environment, including an example extended reality device and an example user device, in accordance with some embodiments of this disclosure.

FIG. 4 shows illustrative user equipment 400 for enabling a user to control content from within a virtual environment by interacting with a virtual twin of a user device. The XR device 402, shown both diagrammatically and schematically, includes components in accordance with some embodiments of this disclosure, such that the XR device 402 shown is not intended to be limiting. The XR device 402 is illustrative of a head-mounted display or any other suitable XR device capable of providing XR content for user consumption. The XR device 402 includes a display 404, control circuitry 406, storage 410, an input/output (I/O) path 412 with associated communication circuitry 414, and a power source 416. The control circuitry 406 may include a processor 408. The XR device 402 may also include one or more integrated components such as a microphone 418, a speaker 420, and/or a camera 422. The XR device 402 may also include an input interface (not shown) for communicably coupling external devices (e.g., game controllers, XR controllers, keyboards, remotes, speakers, etc.) to the XR device 402.

The user device 430, shown schematically, also includes components in accordance with some embodiments of this disclosure, such that the user device 430 shown is not intended to be limiting. In some embodiments, the user device 430 may be a smartphone, a tablet computer, a personal computer, and other similar programmable user devices having a display. The user device 430 includes a display 432, control circuitry 434, storage 438, an input/ output (I/O) path 440 with associated communication circuitry 442, and a power source 444. The control circuitry 434 may include a processor (not shown). The user device 430 may also include one or more integrated components such as a microphone 446, a speaker 448, and/or a camera 450.

Each of the XR device 402 and the user device 430 may access, transmit, receive, and/or retrieve content and data via one or more I/O paths coupled to the respective control circuitry. As an illustrative example based on the XR device 402, I/O path 412 may provide content (e.g., broadcast programming, on-demand programming, Internet content, content available over a local area network (LAN) or wide area network (WAN), and/or other content) and data to the control circuitry 406. The control circuitry 406 may be used to send and receive commands, requests, and other data using I/O path 412 and associated communication circuitry 414. I/O path 412 may communicatively couple control circuitry 406 to one or more communication paths. I/O functions may be provided by one or more of these communication paths but may be shown as a single path to avoid overcomplicating the drawing.

The displays 404, 432 are depicted as generalized embodiments of a display device. The display 404 may include an optical system of one or more optical elements such as a lens in front of an eye of a user, one or more waveguides, or an electro-sensitive plane. The display 404 includes an image source providing light output as an image to the optical element. The image may be modified (e.g., diffracted) using one or more elements of the optical system. For example, a 3D image may be displayed as output of the optical system in front of the eye of the user at the lens. The display 404 may be a 3D display. The display 432 may be, for example, a standard touch sensitive display incorporated into a smartphone, a standard laptop display, or a standard desktop computer display, among other types of displays. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying XR content.

The control circuitry 406, 434 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. Processors 408, 436 may include video processing circuitry (e.g., integrated and/or a discrete graphics processor). In some embodiments, the control circuitry 406, 434 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 406 executes instructions for an XR framework, or parts thereof, stored in memory (e.g., the storage 410). Specifically, the control circuitry 406 may be instructed by an XR framework, or parts thereof, to perform any of the functions described herein. In some implementations, processing or actions performed by the control circuitry 406 may be based on instructions received from an XR framework or parts thereof.

The control circuitry 406, 434 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Conversion circuitry (e.g., for converting over-the-air, analog, or digital signals to MPEG signals for storage) may also be provided. The control circuitry 406 may also include scaler circuitry for upconverting and downconverting content into a suitable output format for the XR device 402. The control circuitry 406, 434 may also include or be communicatively coupled to digital-to-analog converter circuitry and analog-to-digital converter circuitry for converting between digital and analog signals. The tuning and generating circuitry may be used by the XR device 402 to receive and to display, to play, and/or to record content. The tuning and generating circuitry may also be used to receive video generating data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 410 is provided or supplemented by a separate device from the XR device 402, the tuning and generating circuitry (including multiple tuners) may be associated with the storage 410.

The storage 410, 438 may be any device for storing electronic data, such as random-access memory, solid state devices, quantum storage devices, hard disk drives, non-volatile memory or any other suitable fixed or removable storage devices, and/or any combination of the same. The storage 410, 438 may be an electronic storage device that is part of the respective control circuitry 406, 434. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. The storage 410 may store data defining images for display by the head-mounted display. The storage 410 may be used to store various types of content described herein including XR asset data. Nonvolatile memory may also be used (e.g., to launch a boot-up routine and other instructions). Cloud-based storage may be used to supplement the storage 410 or instead of the storage 410.

The control circuitry 406, 434 may include or be coupled to the respective communication circuitry 414, 442, which are suitable for communicating with a server, edge computing systems and devices, a table or database server, or other networks or servers. The instructions for carrying out the above-mentioned functionality may be stored on a server.

Such communications may involve the Internet or any other suitable communication networks or paths. In addition, the communication circuitry 414, 442 may include circuitry that enables peer-to-peer communication of user equipment devices, or communication of user equipment devices in locations remote from each other. In some embodiments, the I/O path 412 may include circuitry that communicatively couples the head-mounted display to one or more other devices over a network. The I/O path 440 may also include such circuitry. For example, the I/O path 412, 440 may include a network adaptor and associated circuitry. The I/O path 412, 440 may include wires and/or busses for connecting to a physical network port (e.g., an ethernet port, a wireless WiFi port, cellular communication port, or any other type of suitable physical port). Although communication paths are not shown between user equipment devices, any of the described devices and equipment may communicate directly or indirectly with each other via one or more communication paths and/or communication networks including short-range, point-to-point communication paths, such as USB cables, IEEE 1394 cables, wireless paths (e.g., Bluetooth, infrared, IEEE 802-11x, etc.), or other short-range communication via wired or wireless paths. For example, the I/O path 412, 440 may include a Bluetooth network adaptor.

The power source 416, 444 may include a source of power or an interface for coupling to an external power source. While not shown, the power source 416 may be coupled to other components of the XR device 402. Some non-limiting examples of a power source 416, 444 include a battery, solar generator, and/or a wired power source.

The microphone 418 and the speaker 420 may be included as integrated equipment with other elements of the XR device 402. The microphone 446 and speaker 448 of the user device 430 may also be included as integrate equipment with other elements of the user device 430. In some embodiments, the microphone 418 and the speaker 420 may be external to the XR device 402 as stand-alone units. An audio component of videos and other content may be played through the speaker 420 (or external headphones or other external audio device). In some embodiments, the control circuitry 406 may be configured to provide audio cues or feedback to the user through the speaker 420. The microphone 418 may receive audio input such as voice commands or speech. For example, a user may speak letters or words that are received by the microphone 418 and converted to text by control circuitry 406. As another example, a user may speak voice commands that are received by the microphone 418 and recognized by control circuitry 406. The camera 422 may be any suitable video camera integrated with the XR device 402. The camera 450 may also be any suitable video camera integrated with the user device 430. In some embodiments, the camera 422, 450 may be externally connected. In some embodiments, the camera 422, 450 may be a digital camera that includes a charge-coupled device (CCD) and/or a complementary metal-oxide semiconductor (CMOS) image sensor. In some embodiments, the camera 422, 450 may be an analog camera that converts still analogue images to digital images via the respective control circuitry 406, 434 or via a video card (not shown).

In some embodiments, the XR device 402 may be communicatively coupled to one or more user input interfaces or devices (not shown). Some examples of input devices include a remote control, a secondary user device, a touch-sensitive display, a smartphone device, a tablet, a remote control, mouse, trackball, keypad, keyboard, touchscreen, touchpad, stylus input, joystick, voice recognition interface, and/or other user input interfaces. In some embodiments, the XR device 402 may include an integrated user input interface capable of tracking a user's eyes and/or detecting visual and/or audio cues. In some embodiments, the XR device 402 may include one or more user interfaces (e.g., buttons, touch-sensitive bars, etc.) for a user to manually provide input to the XR device 402.

As indicated above, an XR framework, or parts thereof, may be implemented using any suitable architecture. By way of example, an XR framework may be configured as a stand-alone application that may be wholly implemented on the XR device 402. Instructions of the application may be stored locally (e.g., in the storage 410), and data for use by the application may be downloaded on a periodic basis (e.g., from an out-of-band feed, from an Internet resource, or using another suitable approach). The control circuitry 406 may retrieve instructions of the application from the storage 410 and process the instructions to provide networking functionality and perform any of the actions described herein.

In some embodiments, an XR framework, or parts thereof, may include a client/server-based application. In client/server-based embodiments, the control circuitry 406 may include or be coupled to the communication circuitry 414 and the I/O path 412 for communicating with a server or other networks or servers. An XR framework, or parts thereof, may be a stand-alone application implemented on a device or a server. An XR framework, or parts thereof, may be implemented as software or a set of executable instructions. An application and/or any instructions for performing any of the embodiments discussed herein may be encoded on computer-readable media. The computer-readable media may be non-transitory, including, but not limited to, volatile and non-volatile computer memory or storage devices such as a hard disk, floppy disk, USB drive, DVD, CD, media card, register memory, processor cache, random access memory (RAM), a hard drive, random-access memory on a DRAM integrated circuit, read-only memory on a BLU-RAY disk, etc. For example, in FIG. 4, the instructions may be stored in the storage 410, and executed by the control circuitry 406 of the XR device 402.

Data for use by a thick or thin client implemented on the XR device 402 may be retrieved on demand by issuing requests to a server remote to the XR device 402. For example, the remote server may store the instructions for the application in a storage device. The remote server may process the stored instructions using circuitry (e.g., the control circuitry 406) and generate the displays discussed above and below. The client device may receive the displays generated by the remote server and may display the content of the displays locally on the XR device 402. This way, the processing of the instructions is performed remotely by the server while the resulting displays (e.g., which may include text, a keyboard, or other visuals) are provided locally on the XR device 402.

In some embodiments, an XR framework, or parts thereof, may be downloaded and interpreted or otherwise run by an interpreter or virtual machine (run by control circuitry 406). In some embodiments, an XR framework, or parts thereof, may be encoded in the ETV Binary Interchange Format (EBIF), received by control circuitry 406 as part of a suitable feed, and interpreted by a user agent running on control circuitry 406. For example, an XR framework, or parts thereof, may include an EBIF application. In some embodiments, an XR framework, or parts thereof, may be defined by a series of JAVA-based files that are received and run by a local virtual machine or other suitable middleware executed by control circuitry 406. In some of such embodiments (e.g., those employing MPEG-2 or other digital media processing schemes), an XR framework, or parts thereof, may be, for example, encoded and transmitted in an MPEG-2 object carousel with the MPEG audio and video packets of a program.

Figure 5:
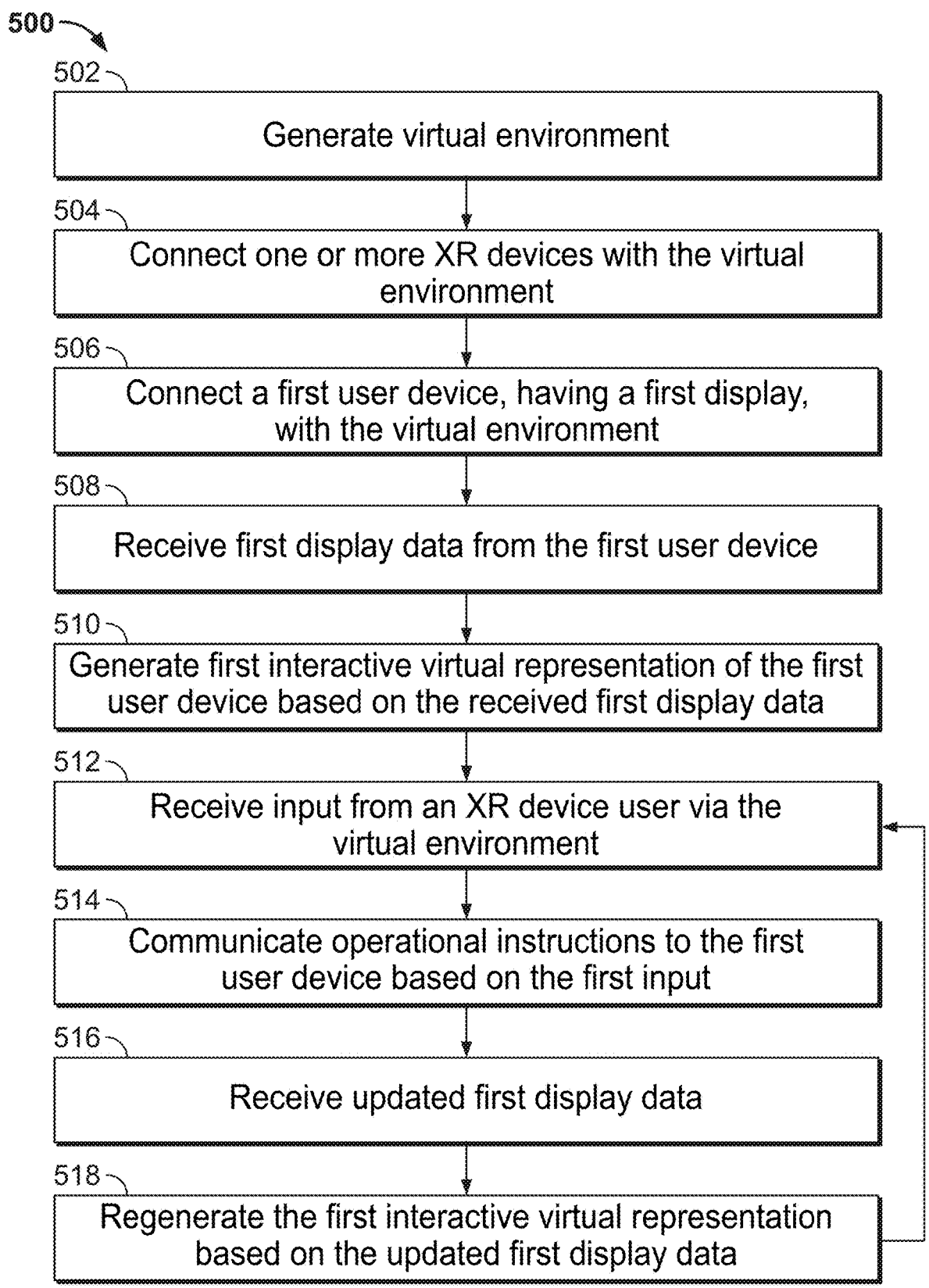
FIG. 5 shows a flowchart of illustrative steps involved in generating a virtual environment which includes at least one interactive virtual representations of a user device.

FIG. 5 shows a flowchart illustrating the steps of a process 500 for enabling control of content from within a virtual environment in accordance with some embodiments of this disclosure. The process 500 may be implemented on the XR framework discussed herein and similar systems for generating and controlling virtual environments. One or more actions of the process may be incorporated into or combined with one or more actions of any other process or embodiments described herein. At step 502, the XR framework generates the virtual environment, and at step 504, the XR framework connects one or more XR devices to the virtual environment. Each XR device that is connected to the XR framework may provide the user of each XR device with interactive access to the virtual environment. At step 506, the XR framework connects one or more user devices to the virtual environment. Each of the user devices connected at step 506 is associated with one of the XR devices already connected to the virtual environment and includes a display. As discussed above, the display may be the primary display for the user device, or the display may be a secondary display of the user device even if the secondary display is not being actively displayed on a display screen by the user device outside of the virtual environment. Each user of a connected XR device may connect at least one user device, and some users of connected XR devices may elect to not connect any user devices. Although there may be multiple user devices connected to the XR framework, in the following steps the process 500 with respect to only a single user device is discussed unless otherwise noted. As will be discussed further below and in examples provided, steps 506-518 may apply to any user device that is connected to the XR framework at step 506. At step 508, the XR framework receives display data from the connected user device, and at step 510 the XR framework generates an interactive virtual representation (virtual twin) of the user device, based on the received display data, within the virtual environment. As discussed above, the virtual twin of the user device includes a virtual display that virtually reproduces, and mirrors, the display of the user device.

At step 512, the XR framework receives input that is generated by one of the XR device users interacting with the virtual environment. For example, the interaction may be with the virtual twin, and in instances where the user device is a smartphone with a touch screen display, an XR device user may interact with the virtual display of the virtual twin via control mechanisms established by the XR framework. As discussed above, those control mechanisms generate the input with respect to the virtual twin, and that is received by the XR framework. As another example, the XR framework may establish other control mechanisms within the virtual environment that are not included as part of the virtual twin such that, when one of the XR device users interacts with these other control mechanisms, the XR framework receives input generated by these other control mechanisms. The received input, regardless of the source within the virtual environment, may be used to control the user device as discussed below.

In some embodiments, any XR device user interacting with the virtual environment may also interact with a user device connected to the virtual environment to generate such input via the user device. In some embodiments, the user of the XR device associated with the user device is the presumed owner of the user device, and other users may be able to interact with the virtual twin of the user device only with permission from the owner. For purposes of this description, it will be assumed that all XR device users connected to the virtual environment may interact with the virtual twin of any user device also connected to the virtual environment.

At step 514, the XR framework communicates operational instructions to the user device based on the input received at step 512. As discussed above, the operational instructions are configured to instruct the user device to perform functions, the functions being based on the received input. In some embodiments, the operational instructions may instruct the user device to perform any function, command, script, and/or process, that may be performed or executed by the control circuitry of the user device, by the operating system of the user device, and/or by any application of the user device, so long as the user device has enabled the functionality and/or permissions of receiving such instructions from an external source (the XR framework in this instance) for being performed on the user device. As such, the operational instructions may be configured to utilize existing systems and/or applications that exist on the user device when instructing the user device to perform one or more functions. For example, the operational instructions may be configured to instruct the user device to communicate with second user device. The second user device may be connected to the virtual environment through the XR framework, or the second device may be not connected to the virtual environment at all. The communication may be a text-based message, a message with accompanying media (e.g., an image, a video, an audio recording, and the like), an email, a phone call, a social networking comment, and/or any other type of interpersonal communication the user device is capable of outside of the virtual environment.

As another example, the communication may be one which transfers data from the user device to the second user device. The data may be in the form of a spreadsheet, a presentation, a database, a generalized or specialized data file, or any other form in which data is stored or storable by the user device. In another example, the operational instructions may be configured to instruct the user device to retrieve content via a network. The network may be any network the user device has access to outside of the virtual environment, such as a local area network (e.g., WiFi, ethernet, etc.) or a wide area network (e.g., the Internet, a 5G, 4G, or LTE network, and the like). The content that the user device retrieves may be any content to which the user device may gain access to over the network, including web pages and web sites, media content, databases, and the like.

During or after the user device performs the functions identified by the operational instructions, at step 516 the XR framework receives updated display data from the user device. At step 518, from that updated display data, the XR framework may regenerate the virtual display of the virtual twin. Following this regeneration, the process may continue repeatedly through steps 512-518 while the user of the XR device and the user device remain connected with the virtual environment.

In some embodiments, the user device may be configured to send all display updates to the XR framework so all display updates may be reflected by the virtual twin. This may be desirable whether the updates to the display result from performing functions communicated by operational instructions or whether the updates to the display are the result of other unrelated processes occurring on the user device (e.g., an incoming phone call, an incoming text message, a notification caused by a calendar entry or another application on the user device, and the like). In such embodiments, the XR device user associated with the user device will receive all updates to the user device while immersed in the virtual environment. Moreover, through interacting with the virtual twin, the user may operate the user device to respond to any or all updates without ever having to leave the virtual environment.

The steps 512-518 may be advantageously used by an XR device user to modify and subsequently save content on a user device. For example, in the virtual environment the virtual twin may display virtual content that is a representation of content data stored on the user device. Such content may be an image, a video, a presentation, or any other type of content available on the user device. By interacting with the virtual content on the virtual twin within the virtual environment, the XR device user may make modifications to the virtual content. Through steps 512, 514, the modifications to the virtual content may be made to the content data on the user device. After the virtual display shows that the modifications have been made, the XR device user may then interact with the virtual display in a way that causes operational instructions to be generated and sent to the user device, with those operational instructions initiating functions to store the modified content data to the user device. In the same manner, the XR device user may also interact with the virtual display to instruct the user device to store the modified content data to a remote network storage, or even to send the modified content data to another user device.

As indicated above, more than one user device may be connected to the virtual environment through steps 506-510. Moreover, by connecting one or more additional user devices to the virtual environment, multiple XR device users within the virtual environment may gain advantage by having access to their user devices without having to exit the virtual environment. The result is that each user device, and particularly content on each user device, may be controlled by XR device users from within the virtual environment. Multiple XR device users may therefore collaborate on content by displaying and interacting with that content via a virtual twin of one of the user devices. In addition, user devices connected to the virtual environment may communicate through communication paths outside the virtual environment. They may also transmit content data outside of the virtual environment. Also, because user devices connected to the virtual environment may inject content into the virtual environment, as discussed above, when XR device users want to have a watch party within the virtual environment, the processing power of each user device may be used to synchronously display a movie or other multimedia to each respective user. This may relieve the XR framework of the processing overhead related to displaying the movie or other multimedia within the virtual environment during such a watch party. These and other advantages are illustrated in the following usage examples.

Figure 6:
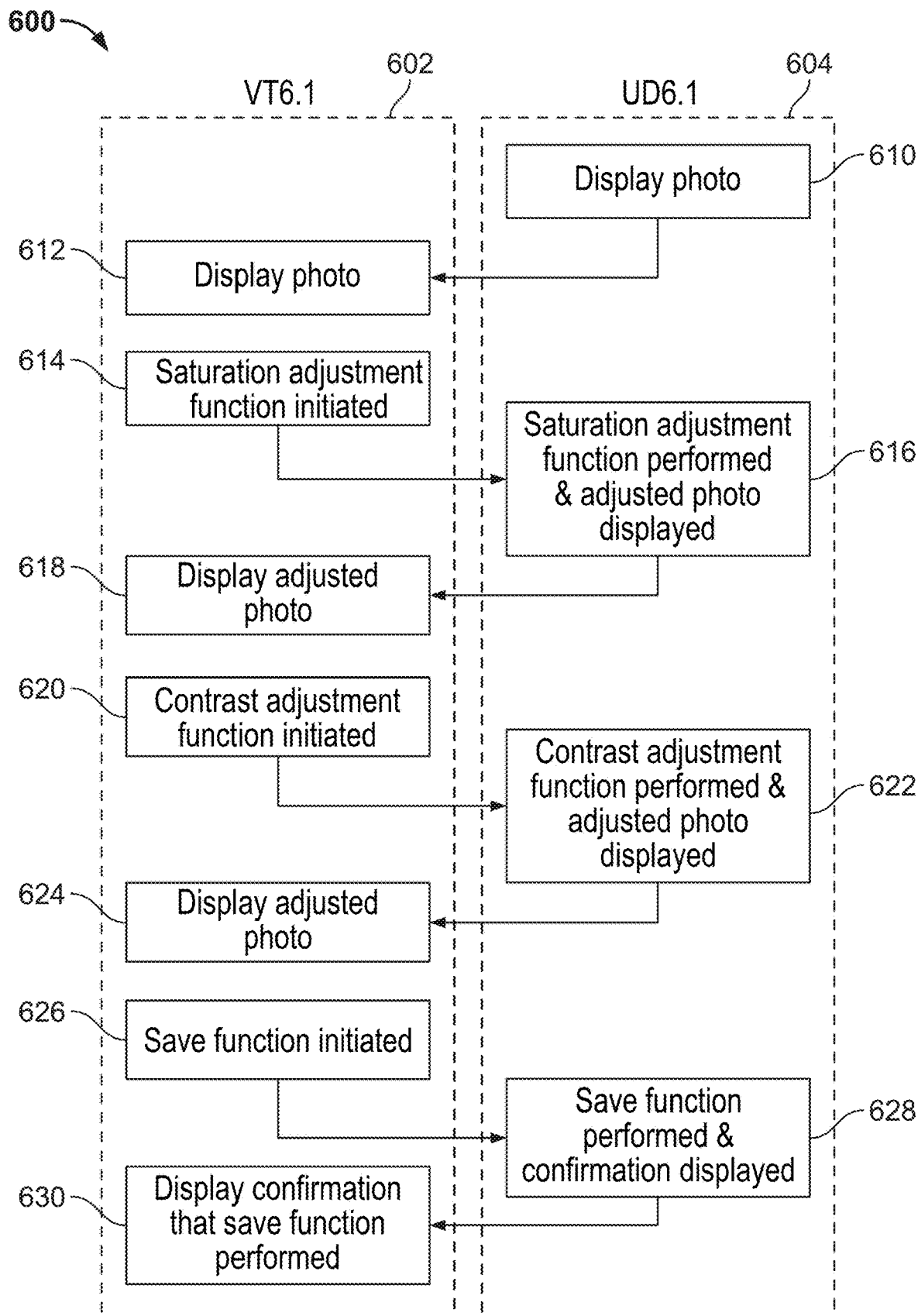
FIG. 6 illustrates an example process flow for controlling the editing of a digital photo on a user device from within a virtual environment using an interactive virtual representation of the user device.

FIG. 6 illustrates a process flow 600 for controlling the editing of a digital photo from within a virtual environment using a user device. The process flow 600 may be implemented on the XR framework discussed herein and similar systems for generating and controlling virtual environments. The user device is connected to an XR framework, and the interactive virtual twin of the user device is generated within the virtual environment in accordance with processes and embodiments described herein. The user device processes are in the column labeled UD6.1, while the virtual twin processes and the XR device user interactions with the virtual twin are in the column labeled VT6.1. As part of this process flow 600, the XR framework may offload the process for editing the digital photo to the user device. By offloading the editing process to the user device, the XR framework transfers the processing load to the user device, which may already include a processor and an application or function that are specialized for such editing tasks.

In this process flow 600, an XR device user is editing a photo, and the virtual twin editing steps 602 are shown alongside the resulting user device functional actions 604. To begin, the user device displays the photo 610 on its display screen, and as a result, the virtual twin likewise displays the photo 612 on the virtual display screen. Within the virtual environment, the XR device user interacts with the virtual twin to initiate a saturation adjustment function 614 on the photo. This interaction generates input that the XR framework receives (FIG. 5, at step 510) and uses to generate operational instructions. The generated operational instructions are communicated to the user device (FIG. 5, at step 512), and in response the user device performs the saturation adjustment function 616 on the photo and updates its display to show the modified photo. The update to the user device display is communicated to the XR framework, and in response the virtual display of the virtual twin is updated to display the adjusted photo 618. Next, the XR device user interacts with the virtual twin to perform a contrast adjustment function 620 on the photo. This interaction generates input that the XR framework receives and uses to again generate operational instructions. The generated operational instructions are communicated to the user device, and in response the user device performs the contrast adjustment function 622 on the photo and updates its display to show further the modified photo. The update to the user device display is communicated to the XR framework, and in response the virtual display of the virtual twin is updated to display the adjusted photo 624. Next, the XR device user interacts with the virtual twin to perform initiate a save function 626 for the adjusted photo. This interaction generates input that the XR framework receives and uses to generate operational instructions once again. The generated operational instructions are communicated to the user device, and in response the user device to perform a save function 628, saving the photo to local storage. After performing the save function 628, the user device updates its display to confirm that the photo was saved. The update to the user device display is communicated to the XR framework, and in response the virtual display of the virtual twin is updated to display the save confirmation 630.

Some tasks like the photo editing of the process flow 600 may be the result of collaboration between two or more XR device users. In such instances, the XR framework may be configured to instruct the user device that edited the file to automatically transfer copies of the edited file (e.g., digital photos, text documents, presentations, videos, and the like) to each of the other user devices connected to the virtual environment. In some embodiments, the XR framework may be configured to allow an XR device user to designate a user device (e.g., FIG. 1, user device 114) not connected to the virtual environment as an associated device, so that at the conclusion of a collaboration, XR framework may instruct the user device that edited the file to automatically transfer copies of the edited file to the designated associated device.

Figure 7:
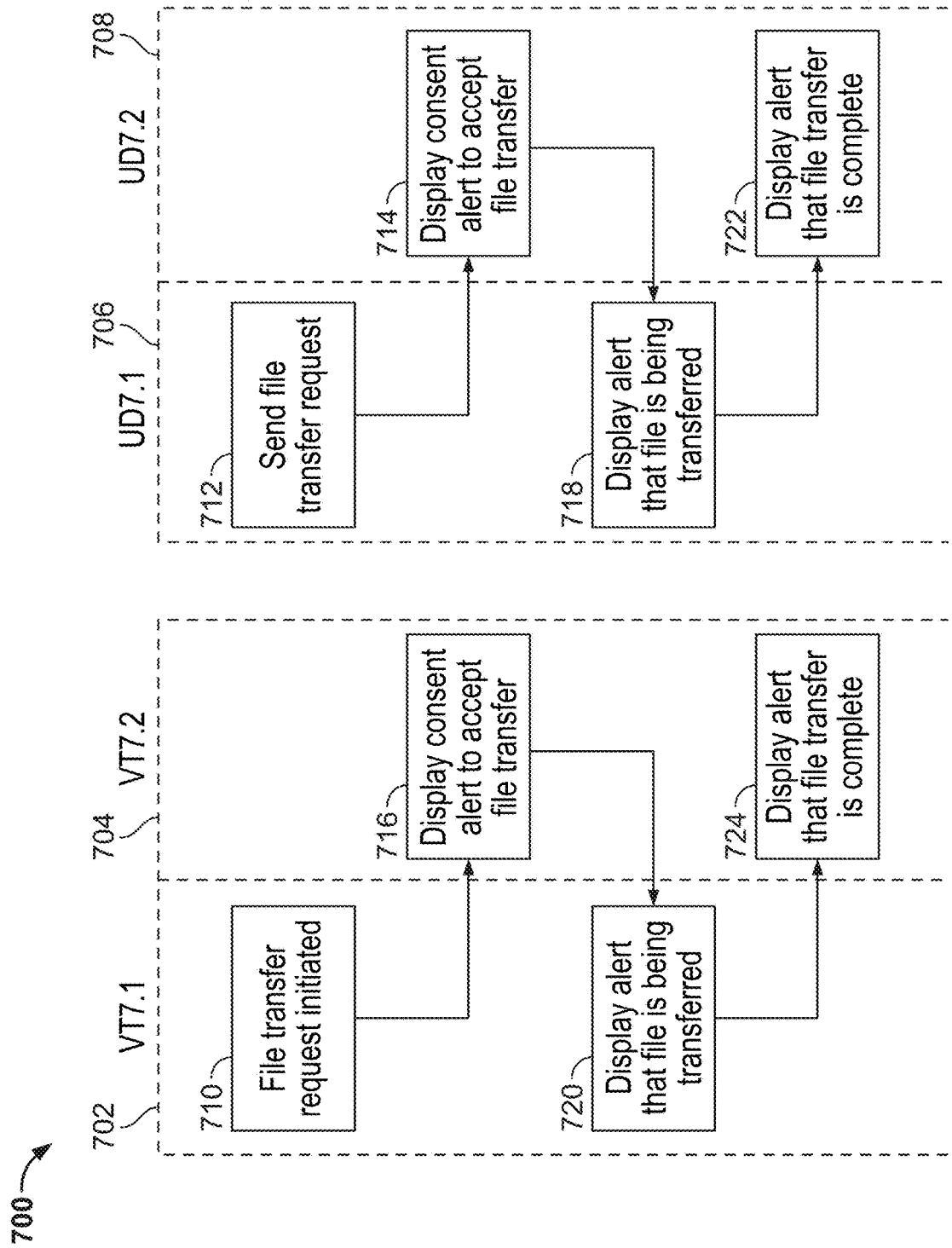
FIG. 7 illustrates an example process flow for controlling the sending and receiving of a file between user devices from within a virtual environment using interactive virtual representations of the user devices.

FIG. 7 illustrates a process flow 700 for controlling the sending and receiving of a file from within a virtual environment using two user devices. This process flow 700 enables the direct transfer of a file even in instances where the user devices are geographically non-local to each other. The process flow 700 may be implemented on the XR framework discussed herein and similar systems for generating and controlling virtual environments. The user devices are connected to an XR framework, and the interactive virtual twins of each user device is generated within the virtual environment in accordance with processes and embodiments described herein. The user device processes are in the columns labeled UD7.1 and UD7.2, while the virtual twin processes and the XR device user interactions with the virtual twins are in the column labeled VT7.1 and VT7.2. In some embodiments, the user devices, and thus the virtual twins, may be associated with different XR device users.

In this process flow 700, a first XR device user is sending a photo to a second XR device user. The first virtual twin process steps 702 are shown alongside the second virtual twin process steps 704, while the first user device functional steps 706 are shown alongside the second user device functional steps 708. For purposes of clarity in describing this process flow 700, the assumption is made that all XR device user interactions 702, 704 with the virtual twins result in generating and communicating operational instructions to the associated user device (FIG. 5, at steps 512-514). In addition, the assumption is made that all functional steps 706, 708 taken by either of the user devices result in display changes on each respective user device, and those display changes are communicated to the XR framework so that the virtual twins may be updated to reflect the display changes (FIG. 5, at steps 516-518).

As a start to the process flow 700, the XR device user interacts with the first virtual twin to initiate a file transfer request 710 which will transfer a photo to the second virtual twin. Some user devices, depending upon their systems, processes, and/or applications, may need to establish a direct connection between each other prior to initiating such a file transfer request. In some embodiments, the XR framework may establish a bridge between the user devices to establish the direct connection. In some embodiments, the XR framework may facilitate the user devices establishing a direct connection. In such embodiments, the XR framework may provide each user device information about the other user device. The information provided may include any of the information collected by the XR framework about each user device when initially connecting to the virtual environment.

The XR device user's interaction with the first virtual twin at step 710 results in the first user device performing the function of initiating a photo file transfer request 712 to transfer a photo file to the second user device. The photo file transfer request 712 of the first user device results in the second user device displaying an alert 714 to get consent for accepting the requested photo file transfer. In response to the second user device displaying the alert 714, the second virtual twin also displays an alert 716 for consent to accept the requested photo file transfer on the virtual display. The XR device user of the second virtual twin interacts with the second virtual twin in response to the photo file transfer alert 716, and the interaction of consenting to the photo file transfer on the virtual twin results in the second user device also consenting to the photo file transfer. In response to the second user device consenting to the photo file transfer, the first user device begins the photo file transfer and displays a message 718 that the transfer is in progress. In response to the first user device displaying the alert 718, the first virtual twin also displays an alert 720 that the transfer is in progress. Following completion of the transfer, the second user device displays a message 722 that the photo file transfer is complete, and in response the second virtual twin also displays a message 724 that the photo file transfer is complete.

The direct file transfer process 700 is achieved using systems, processes, and/or applications already available on the user devices. These are systems, processes, and/or applications that not only already available on the user devices, but also familiar to the users of those user devices. XR device users might also take advantage of indirect methods of transferring files that are available on user devices. Examples of indirect methods include MMS messaging, cloud storage, and email, among others.

Figure 8:
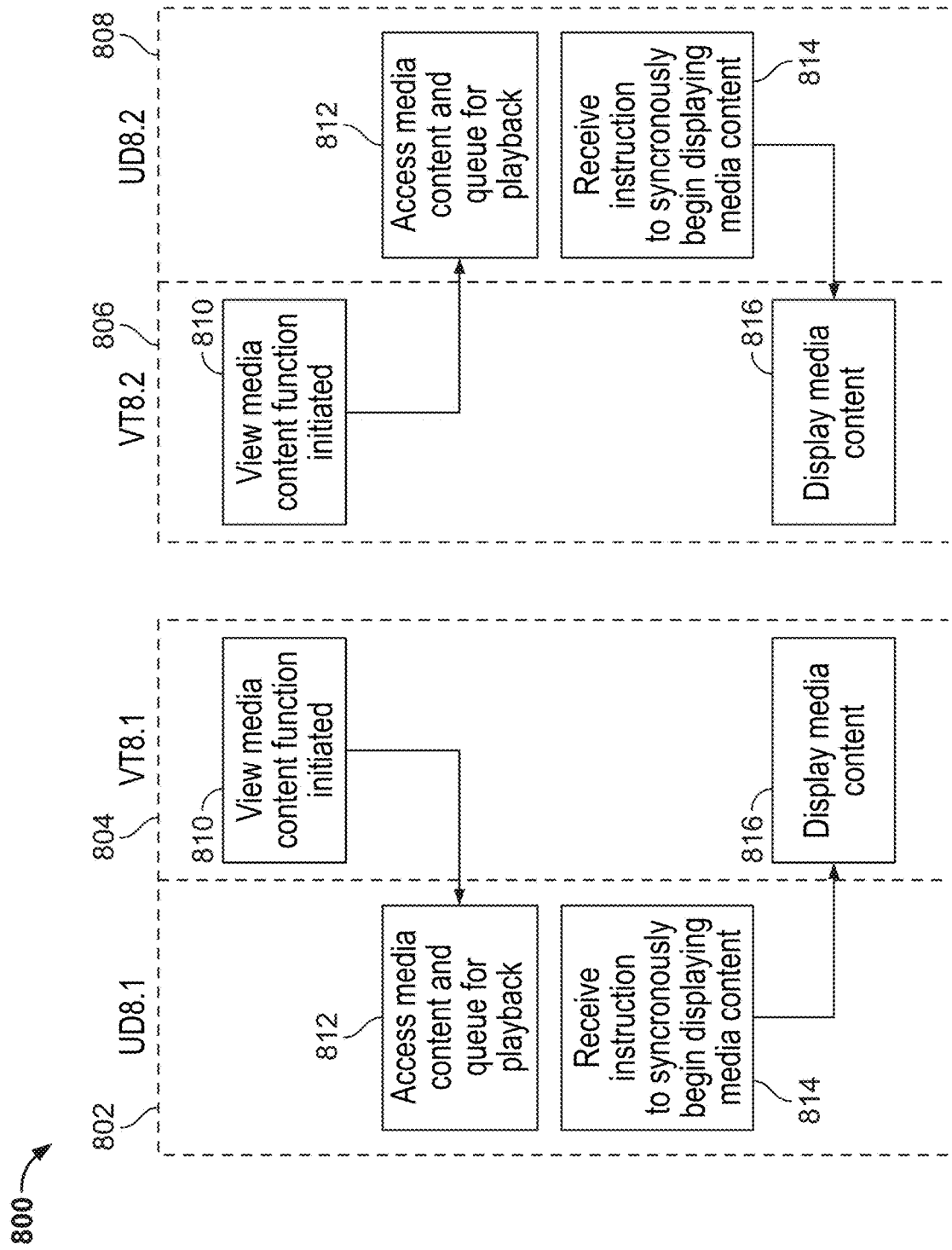
FIG. 8 illustrates an example process flow for controlling the viewing of media content in a virtual environment using interactive virtual representations of user devices.

FIG. 8 illustrates a process flow 800 for controlling the synchronous viewing of media content in a virtual environment using two user devices. The process flow 800 may be implemented on the XR framework discussed herein and similar systems for generating and controlling virtual environments. The user devices are connected to an XR framework, and the interactive virtual twins of each user device is generated within the virtual environment in accordance with processes and embodiments described herein. The user device processes are in the columns labeled UD8.1 and UD8.2, while the virtual twin processes and the XR device user interactions with the virtual twins are in the column labeled VT8.1 and VT8.2. As synchronous viewing within a virtual environment is typically done with two XR device users, this process flow is discussed in terms of each user device being associated with different XR devices. For purposes of clarity in describing this process flow 800, the assumption is made that all XR device user interactions 804, 806 with the virtual twins result in generating and communicating operational instructions to the associated user device (FIG. 5, at steps 512-514). In addition, the assumption is made that all functional steps 802, 808 taken by either of the user devices result in display changes on each respective user device, and those display changes are communicated to the XR framework so that the virtual twins may be updated to reflect the display changes (FIG. 5, at steps 516-518). Also, as part of this process the user devices may communicate directly with the XR framework leading up to synchronously presenting the media content to the XR device users. Such communication may include confirmation that the media content has been accessed and is ready for presenting to the XR device users, and instructions from the XR framework to begin the synchronous presentation.

In this process flow 800, the XR device users interact with the virtual environment to indicate a desire to view (or listen to) media content together within the virtual environment and select the media content for viewing (or listening to). In some embodiments, the virtual twins may provide a media content interface for the XR device users to interact with and select media content for viewing (or listening to). In some embodiments, the XR framework may provide a media content interface within the virtual environment, but not integrated with the virtual twins, for the XR device users to select the media content for viewing (or listening to). The media content interface, whether integrated into one of the virtual twins or otherwise provided within the virtual environment, may offer the users options of media content to watch and sources where the media content is available. Through the provided interface, the XR framework will also determine a source for the media content. In some embodiments, one of the user devices may be the source for the media content. In some embodiments, a streaming media provider may be the source for the media content. In some embodiments, a media content server or other server accessible through a network may be the source for the media content.

In the process flow 800, the virtual twins present the XR device users with a media content interface for selecting a movie to watch, and at step 810, each XR device user initiates a function, via each XR device user's associated virtual twin, to view the media content. At step 812, each user device accesses the media content. Here, the operational instructions instruct each user device to queue up the media content, but there is no instruction to begin playing the media content until each user device confirms with the XR framework that the movie is accessed and queued up. The manner in which the media content is accessed and queued up depends on the source of the media content. For example, if the media source is a streaming service, the user devices may access the movie and begin buffering the media stream for the movie. For example, if the media source is a download service, the user devices may access the movie and download a predetermined percentage of the movie file. For example, if the media source is one of the user devices, the media file may be fully copied to the other device first. Once the user devices confirm to the XR framework that the movie is accessed and queued up, at step 814 the user devices receive instructions from the XR framework to synchronously begin displaying the movie. At step 816, the virtual twin of each user device then displays the movie on each respective virtual display, thereby enabling the XR device users to enjoy synchronously watching the movie within the virtual environment. In this process flow 800, synchronous playback may be achieved by each user device injecting the movie directly into the virtual environment for display on each respectively associated virtual twin. Also, as part of synchronous playback, the XR framework may disable updates on the non-associated virtual twin for each XR framework. In some embodiments, when one XR device user pauses, forwards, rewinds, or performs some other action relating to the movie playback, the XR framework may synchronize that same action for both XR device users viewing the movie through control of the user devices.

What is claimed is:

1. A method of controlling content from within a virtual environment, the method comprising:
    connecting a first extended reality device with the virtual environment, the first extended reality device providing a first user with interactive access to the virtual environment;
    connecting a second extended reality device with the virtual environment, the second extended reality device providing a second user with interactive access to the virtual environment;
    connecting a first user device with the virtual environment, the first user device comprising a first display;
    receiving first display data from the first user device, the first display data based on the first display;
    generating a first interactive virtual representation of the first display in the virtual environment, the first interactive virtual representation based on the first display data;
    receiving first input from one of the first user and the second user via the virtual environment; and
    communicating first operational instructions to the first user device based on the received first input, wherein the first operational instructions are configured to instruct the first user device to perform first functions based on the received first input.

2. The method of claim 1, further comprising:
    receiving updates to the first display data from the first user device in response to the communicated first operational instructions; and
    regenerating the first interactive virtual representation based on the updates to the first display data.

3. The method of claim 1, wherein receiving the first input via the virtual environment comprises receiving the first input via the first interactive virtual representation.

4. The method of claim 1, wherein the first operational instructions are configured to instruct the first user device to communicate with a second user device.

5. The method of claim 1, wherein the first operational instructions are configured to instruct the first user device to transfer content data to a second user device.

6. The method of claim 1, wherein the first operational instructions are configured to instruct the first user device to retrieve content data via a network.

7. The method of claim 1, wherein:
    generating the first interactive virtual representation of the first display comprises generating the first interactive virtual representation to include first virtual content, the first virtual content comprising a representation of first content data stored on the first user device;
    receiving the first input comprises receiving first modifications to the first virtual content; and
    the first operational instructions are configured to instruct the first user device to modify the first content data based on the received first modifications.

8. The method of claim 7, wherein the first operational instructions are further configured to instruct the first user device to store the modified first content data on the first user device.

9. The method of claim 1, further comprising:
    connecting a second user device with the virtual environment, the second user device comprising a second display;
    receiving second display data from the second user device, the second display data based on the second display; and
    generating a second interactive virtual representation of the second display in the virtual environment, the second interactive virtual representation based on the second display data.

10. The method of claim 9, wherein the first operational instructions are configured to instruct the first user device to communicate with the second user device outside of the virtual environment.

11. The method of claim 9, wherein the first operational instructions are configured to instruct the first user device to transmit content data to the second user device outside of the virtual environment.

12. The method of claim 9, further comprising:
    receiving a second input from one of the first user and the second user via the virtual environment; and
    communicating second operational instructions to the second user device based on the received second input, wherein the second operational instructions are configured to instruct the second user device to perform second functions based on the received second input.

13. The method of claim 12, wherein:
    the first operational instructions are configured to instruct the first user device to connect to media content data via a network for synchronized display of the media content data with the second user device; and
    the second operational instructions are configured to instruct the second user device to connect to the media content data via the network for synchronized display of the media content data with the first user device.

14. The method of claim 9, further comprising:
    receiving updates to the second display data from the second user device in response to the first operational instructions communicated to the first user device; and regenerating the second interactive virtual representation based on the updates to the second display data.

15. The method of claim 9, further comprising receiving first changes to the first display data and second changes to the second display data in response to the communicated first operational instructions.

16. A method of controlling content from within a virtual environment, the method comprising:
- connecting an extended reality device with the virtual environment;
- connecting a user device with the virtual environment, the user device comprising a display;
- receiving display data from the user device, the display data based on the display;
- generating an interactive virtual representation of the display in the virtual environment, the interactive virtual representation based on the display data;
- receiving input via the virtual environment; and
- communicating operational instructions to the user device based on the received input, wherein the operational instructions are configured to instruct the user device to perform functions based on the received input.

17. The method of claim 16, further comprising:
- receiving updates to the display data from the user device in response to the communicated operational instructions; and
- regenerating the interactive virtual representation based on the updates to the display data.

18. The method of claim 16, wherein receiving the input via the virtual environment comprises receiving the input via the interactive virtual representation.

19. The method of claim 16, wherein the operational instructions are configured to instruct the user device to communicate with another user device.

20. The method of claim 16, wherein the operational instructions are configured to instruct the user device to transfer content data to another user device.

* * * * *